US012731458B2

(12) United States Patent
Shepherd et al.

(10) Patent No.: US 12,731,458 B2
(45) Date of Patent: Sep. 8, 2026

(54) SYNCHRONIZING ACCOUNT RESTRICTIONS BETWEEN GAMING ESTABLISHMENT ACCOUNT AND ASSOCIATED PAYMENT INSTRUMENT

(71) Applicant: IGT, Las Vegas, NV (US)

(72) Inventors: Jeffery Shepherd, Reno, NV (US); Kevin Higgins, Reno, NV (US)

(73) Assignee: IGT, Las Vegas, NV (US)

( * ) Notice: Subject to any disclaimer, the term of this patent is extended or adjusted under 35 U.S.C. 154(b) by 442 days.

(21) Appl. No.: 18/080,477

(22) Filed: Dec. 13, 2022

(65) Prior Publication Data

US 2024/0194025 A1 Jun. 13, 2024

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G06Q 20/26*** | (2012.01) |
| ***G06Q 20/42*** | (2012.01) |
| ***G06Q 50/34*** | (2012.01) |
| ***G07F 17/32*** | (2006.01) |

(52) U.S. Cl.

CPC ......... *G07F 17/3244* (2013.01); *G06Q 20/26* (2013.01); *G06Q 20/42* (2013.01); *G06Q 50/34* (2013.01); *G07F 17/3239* (2013.01)

(58) Field of Classification Search

CPC ... G07F 17/32; G07F 17/3214; G07F 17/3222

USPC .............................. 463/1, 20, 22, 25, 30, 39

See application file for complete search history.

(56) References Cited

U.S. PATENT DOCUMENTS

| | | | |
|---|---|---|---|
| 6,378,775 | B2 | 4/2002 | Hayashida |
| 6,876,971 | B1 | 4/2005 | Burke |
| 7,268,667 | B2 | 9/2007 | Beenau et al. |
| 7,722,466 | B2 | 5/2010 | Rothschild |
| 8,308,554 | B2 | 11/2012 | Rowe et al. |
| 8,423,475 | B2 | 4/2013 | Bishop et al. |
| 8,452,687 | B2 | 5/2013 | Rowe |
| 8,595,137 | B2 | 11/2013 | Sears et al. |
| 8,696,463 | B2 | 4/2014 | Potts et al. |
| 8,708,809 | B2 | 4/2014 | Sanford et al. |
| 8,998,708 | B2 | 4/2015 | Sanford et al. |
| 9,196,123 | B2 | 11/2015 | Sanford et al. |
| 9,245,410 | B2 | 1/2016 | Anderson et al. |
| 9,251,651 | B2 | 2/2016 | Sanford et al. |
| 9,293,002 | B2 | 3/2016 | Richards et al. |
| 9,466,176 | B2 | 10/2016 | Sanford et al. |
| 9,613,491 | B2 | 4/2017 | Roth |
| 9,785,926 | B2 | 10/2017 | Sanford et al. |
| 10,410,468 | B1 | 9/2019 | Sanford et al. |

(Continued)

*Primary Examiner* — Adetokunbo O Torimiro

(74) *Attorney, Agent, or Firm* — Neal, Gerber & Eisenberg LLP

(57) ABSTRACT

Responsive to a restriction placement event occurring in association with a debit card operable to access funds maintained in a first gaming establishment account, and a restriction being placed on the debit card, systems and methods place a restrictions on the first gaming establishment account, and communicate data associated with the placed restriction. Responsive to a first component that maintains a second gaming establishment account receiving the data, the first component determines whether to place the restriction on the second gaming establishment account.

20 Claims, 5 Drawing Sheets

(56) References Cited

U.S. PATENT DOCUMENTS

| | | | | |
|---|---|---|---|---|
| 10,573,128 | B2 | 2/2020 | Sanford et al. | |
| 10,713,893 | B2 | 7/2020 | Sanford et al. | |
| 10,916,092 | B2 | 2/2021 | Richards et al. | |
| 10,977,894 | B2 | 4/2021 | Sanford et al. | |
| 11,062,562 | B2 | 7/2021 | Shepherd et al. | |
| 11,062,563 | B2 | 7/2021 | Shepherd et al. | |
| 11,164,420 | B2 | 11/2021 | Shepherd et al. | |
| 11,488,446 | B2 | 11/2022 | Potts et al. | |
| 2002/0039921 | A1* | 4/2002 | Rowe | G07F 17/3239 463/16 |
| 2002/0145051 | A1* | 10/2002 | Charrin | G06K 19/077 235/492 |
| 2005/0054439 | A1 | 3/2005 | Rowe et al. | |
| 2009/0005159 | A1 | 1/2009 | Netley et al. | |
| 2011/0118008 | A1 | 5/2011 | Taylor | |
| 2012/0190433 | A1 | 7/2012 | Rowe | |
| 2013/0225282 | A1 | 8/2013 | Williams et al. | |
| 2014/0057703 | A1* | 2/2014 | LeStrange | G07F 17/3255 463/25 |
| 2017/0092054 | A1 | 3/2017 | Petersen et al. | |
| 2018/0268651 | A1 | 9/2018 | Jones | |
| 2022/0068088 | A1 | 3/2022 | Higgins et al. | |
| 2022/0193557 | A1 | 6/2022 | Higgins et al. | |
| 2022/0262198 | A1 | 8/2022 | Higgins et al. | |

* cited by examiner

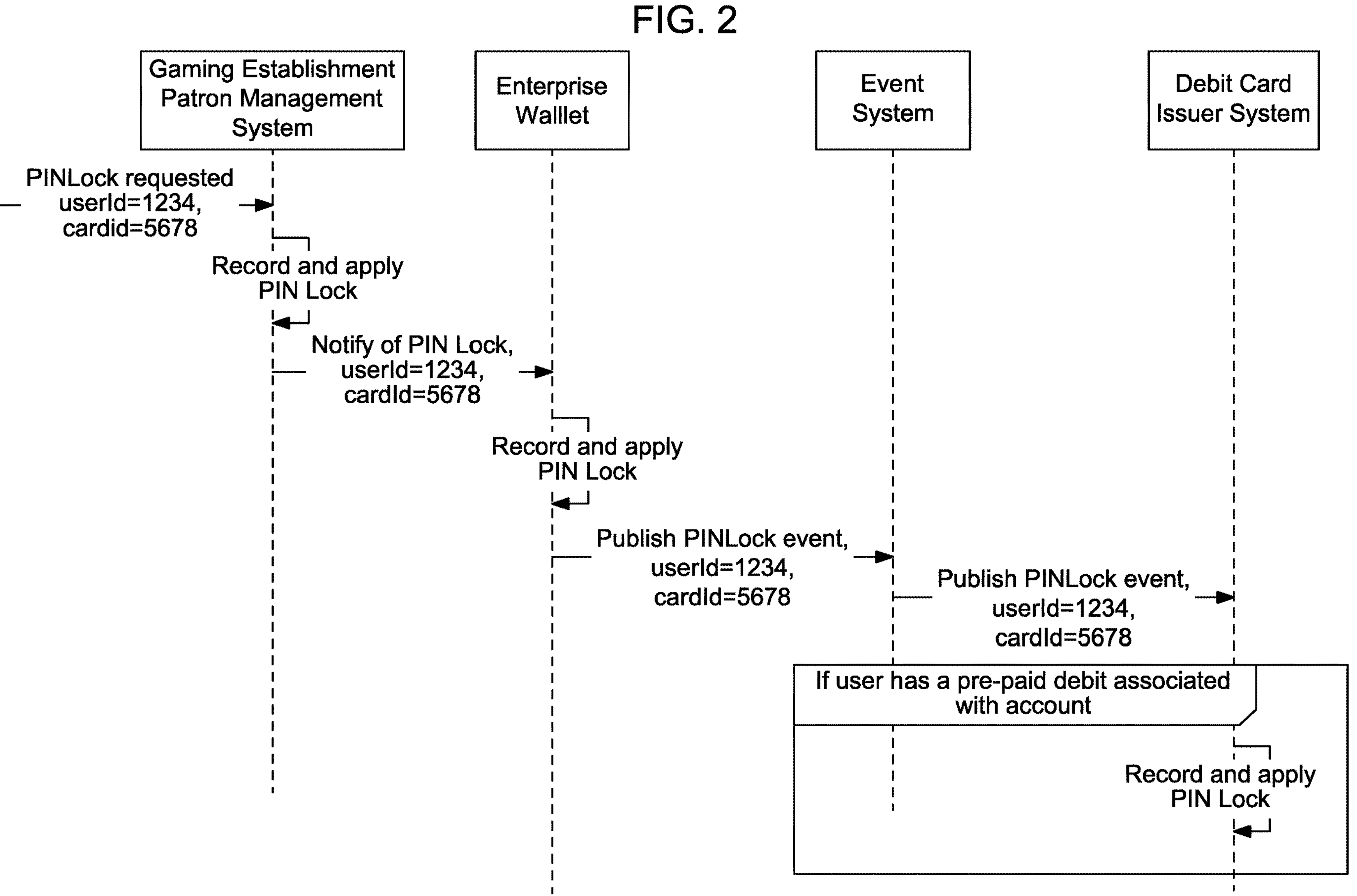
FIG. 2
Gaming Establishment Patron Management System
Enterprise Walllet
Event System
Debit Card Issuer System
PINLock requested userId=1234, cardid=5678
Record and apply PIN Lock
Notify of PIN Lock, userId=1234, cardId=5678
Record and apply PIN Lock
Publish PINLock event, userId=1234, cardId=5678
Publish PINLock event, userId=1234, cardId=5678
If user has a pre-paid debit associated with account
Record and apply PIN Lock

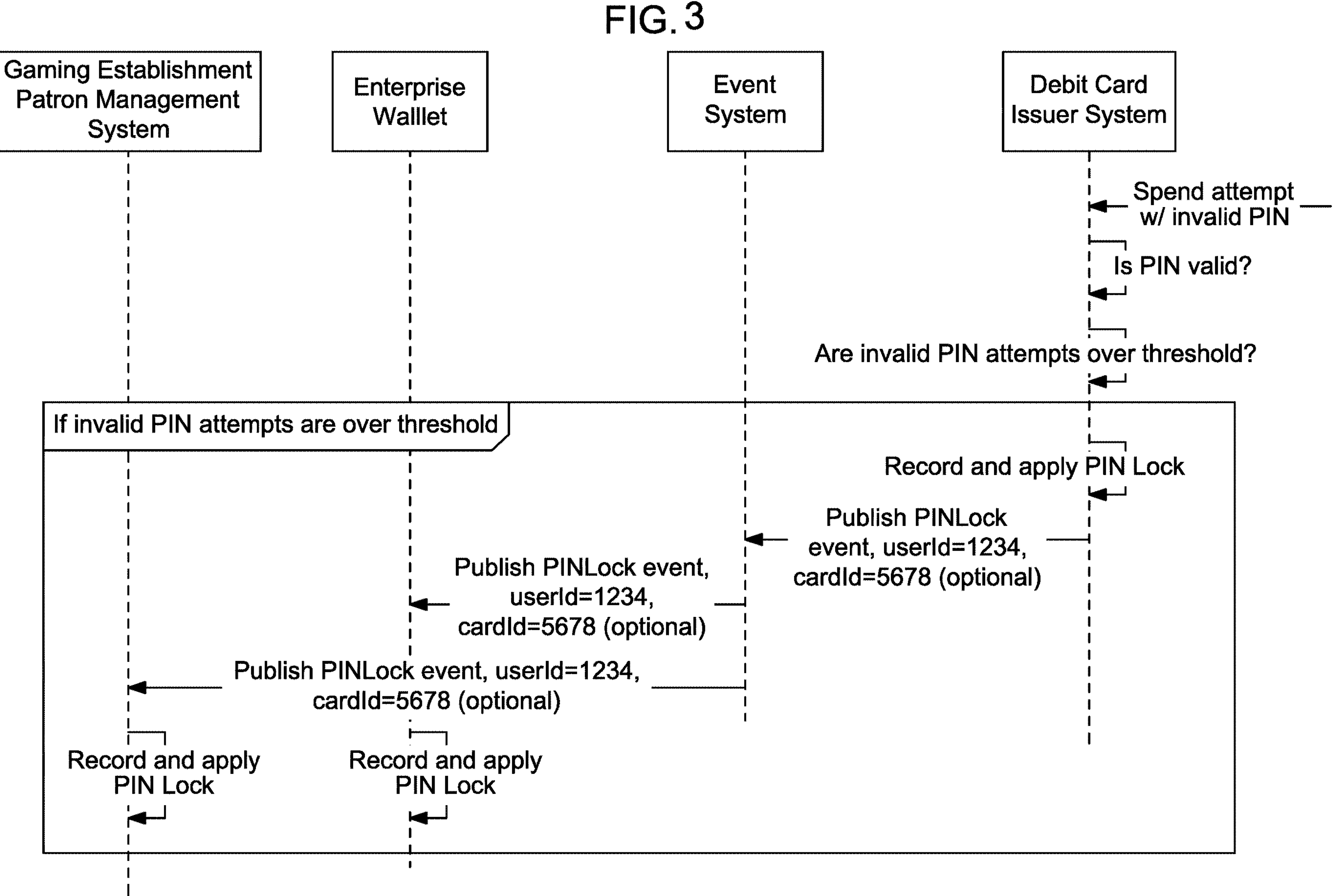
FIG. 3
Gaming Establishment Patron Management System
Enterprise Walllet
Event System
Debit Card Issuer System
Spend attempt w/ invalid PIN
Is PIN valid?
Are invalid PIN attempts over threshold?
If invalid PIN attempts are over threshold
Record and apply PIN Lock
Publish PINLock event, userId=1234, cardId=5678 (optional)
Publish PINLock event, userId=1234, cardId=5678 (optional)
Publish PINLock event, userId=1234, cardId=5678 (optional)
Record and apply PIN Lock
Record and apply PIN Lock

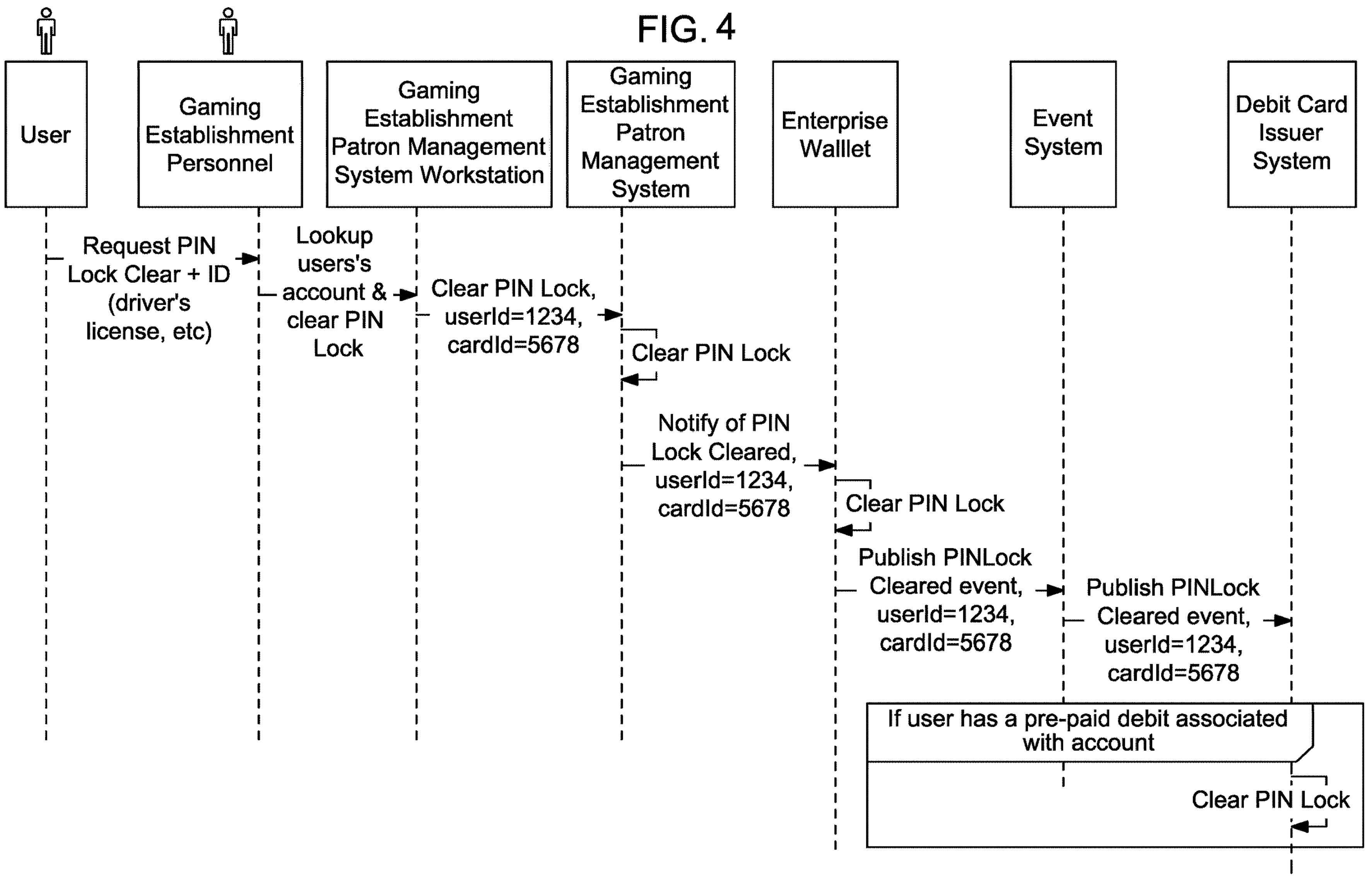
FIG. 4
User
Gaming Establishment Personnel
Gaming Establishment Patron Management System Workstation
Gaming Establishment Patron Management System
Enterprise Walllet
Event System
Debit Card Issuer System
Request PIN Lock Clear + ID (driver's license, etc)
Lookup users's account & clear PIN Lock
Clear PIN Lock, userId=1234, cardId=5678
Clear PIN Lock
Notify of PIN Lock Cleared, userId=1234, cardId=5678
Clear PIN Lock
Publish PINLock Cleared event, userId=1234, cardId=5678
Publish PINLock Cleared event, userId=1234, cardId=5678
If user has a pre-paid debit associated with account
Clear PIN Lock User
Enterprise Wallet
Debit Card
Debit Card Issuer System
Debit Card Backing Account
Retail Point-of-Sale System
Initiate Purchase
Purchase Swipe / card insertion / tap
enter PIN info when prompted
hash/ encrypt PIN as required
Request Transfer amount = $100, PIN data
authorization failure, reason=PIN Lock

SYNCHRONIZING ACCOUNT RESTRICTIONS BETWEEN GAMING ESTABLISHMENT ACCOUNT AND ASSOCIATED PAYMENT INSTRUMENT

CROSS-REFERENCE TO RELATED APPLICATIONS

This application is related to the following commonly owned co-pending patent applications: U.S. application Ser. No. 18/080,461, entitled "SYNCHRONIZING ACCOUNT RESTRICTIONS BETWEEN GAMING ESTABLISHMENT ACCOUNT AND ASSOCIATED PAYMENT INSTRUMENT".

BACKGROUND

In various embodiments, the systems and methods of the present disclosure synchronize account restrictions between gaming establishment accounts and/or a gaming establishment account and a payment instrument, such as a debit card, employed to access funds associated with the gaming establishment account.

Casinos are associated with multiple different channels of commerce including gaming activities (e.g., wagers on plays of games at electronic gaming machines and gaming tables) and non-gaming activities (e.g., making retail purchases at point-of-sale terminals throughout the casino).

BRIEF SUMMARY

In certain embodiments, the present disclosure relates to a system including a processor, and a memory device that stores a plurality of instructions. When executed by the processor responsive to a restriction placement event occurring in association with a debit card associated with a first gaming establishment account, and a restriction being placed on the debit card, the instructions cause the processor to place a restriction on the first gaming establishment account and communicate data associated with the placed restriction. In these embodiments, responsive to a first component that maintains a second gaming establishment account receiving the data, the first component determines whether to place the restriction on the second gaming establishment account.

In certain embodiments, the present disclosure relates to a system including a processor, and a memory device that stores a plurality of instructions. When executed by the processor responsive to a restriction being placed on a debit card associated with a cashless wagering account, the instructions cause the processor to place a restriction on the cashless wagering account, and communicate data associated with the placed restriction to a component of an event system that publishes the data associated with the placed restriction for another component that maintains another gaming establishment account to receive and apply the restriction to that other gaming establishment account. When executed by the processor responsive to no restriction being placed on the debit card associated with the cashless wagering account, the instructions cause the processor to enable the debit card to initiate a purchase transaction at a point-of-sale terminal.

In certain embodiments, the present disclosure relates to a method of operating a system. Responsive to a restriction placement event occurring in association with a debit card associated with a first gaming establishment account, and a restriction being placed on the debit card, the method includes placing, by a processor, a restriction on the first gaming establishment account, and communicating data associated with the placed restriction. In these embodiments, responsive to a first component that maintains a second gaming establishment account receiving the data, the first component determines whether to place the restriction on the second gaming establishment account.

Additional features are described herein, and will be apparent from the following Detailed Description and the figures.

BRIEF DESCRIPTION OF THE SEVERAL VIEWS OF THE DRAWINGS

FIG. 2 is a flow chart of an example process for operating a system which enables a restriction to be synchronized from one account to another account.

FIG. 3 is a flow chart of an example process for operating a system which enables a restriction to be synchronized from one account to another account.

FIG. 4 is a flow chart of an example process for operating a system which enables a cleared restriction to be synchronized from one account to another account.

DETAILED DESCRIPTION

Figure 1:
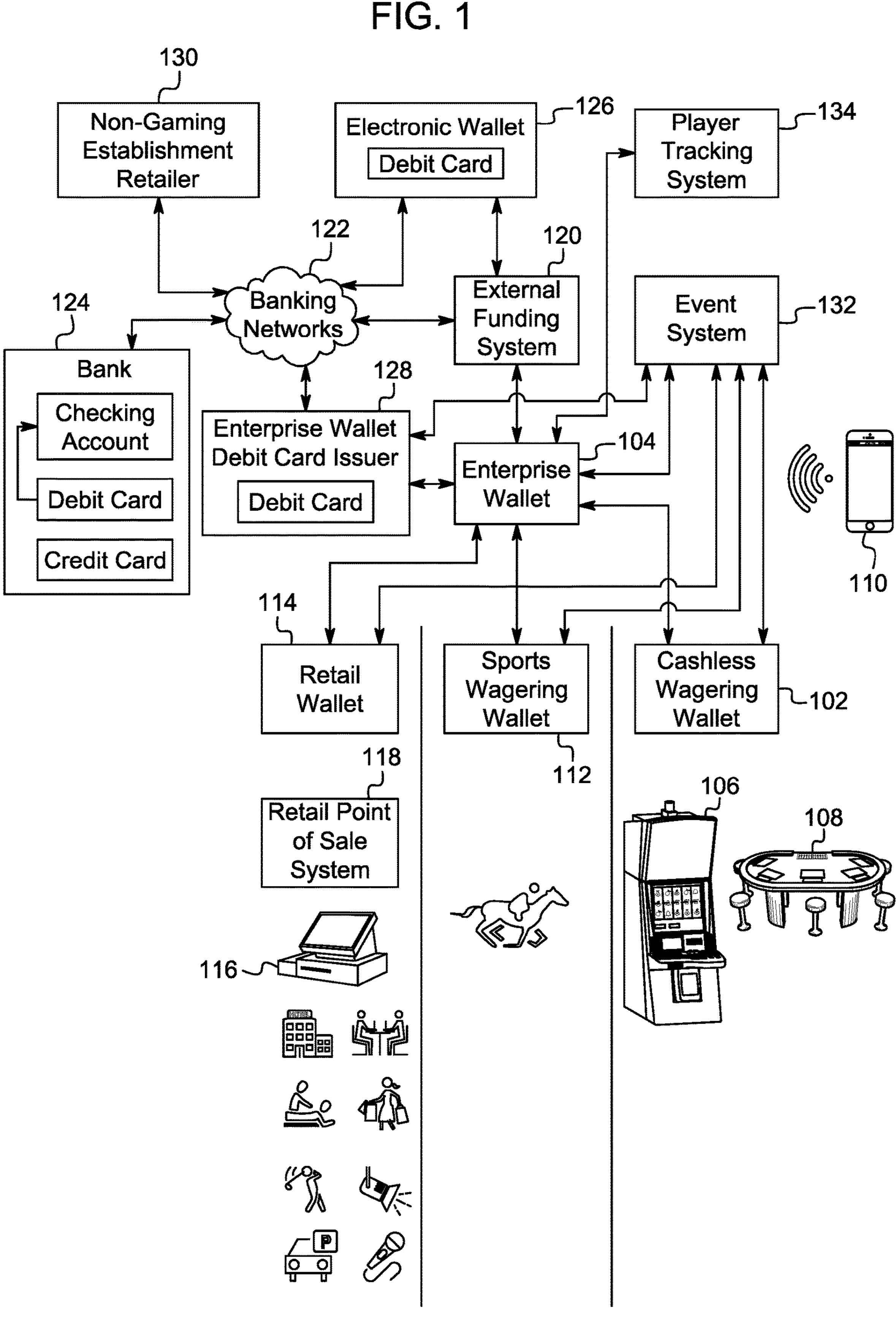
FIG. 1 is an example configuration of the architecture of a plurality of different components of the system of the present disclosure.

In various embodiments, the systems and methods of the present disclosure synchronize account restrictions between gaming establishment accounts and/or a gaming establishment account and a payment instrument, such as a debit card, employed to access funds associated with the gaming establishment account.

In certain embodiments, in association with the integration of a debit card issued by a financial institution with one or more gaming establishment accounts maintained by a gaming establishment fund management system, the system of the present disclosure synchronizes zero, one or more restrictions based on the debit card and/or such gaming establishment accounts. In these embodiments, while the debit card operates as a gateway to potentially access, in real time and based on whether the gaming establishment fund management system authorizes or declines an attempted transaction, funds associated with a gaming establishment account, one or more components of the system monitor for any restriction placement events associated with the debit card and/or the gaming establishment account and apply zero, one or more restrictions, such as account blocks or account locks, responsive to certain events occurring. As such, the system synchronizes different states between one or more gaming establishment accounts and a pre-paid debit card (which is operable with a network payment processor to enable financial transactions at a retailer, such as a retailer remote and independent from any gaming establishments) to reduce the likelihood of fraud when suspicious activity occurs in association with any of the gaming establishment accounts and/or the pre-paid debit card.

In operation of certain embodiments, one or more components of one or more systems, such as a server of a financial institution that issued the debit card and/or a server of a gaming establishment fund management system, monitor for an occurrence of certain designated activity, such as activities that qualify as an occurrence of a material event relative to a gaming establishment account and/or a debit card employed to access funds associated with that gaming establishment account. In certain such embodiments, if activities representative of malicious activity are detected, such components designate this activity as occurring in association with one or more gaming establishment accounts and/or a debit card employed to access funds in one or more gaming establishment accounts. In certain embodiments, such a designation includes modifying the state of the gaming establishment account and/or the debit card, such as placing a block, a lock and/or a closure on such a gaming establishment account and/or the debit card. For example, if activity occurs in association with a gaming establishment account that indicates fraud or an attempted fraud (i.e., an occurrence of a material event relative to that gaming establishment account), a component associated with that gaming establishment account places a block on that gaming establishment account (i.e., applies an account restriction). In another example, if activity occurs in association with a debit card that indicates that the debit card was lost or attempted to be used in a fraudulent manner (e.g., too many failed attempts to input a correct personal identification number ("PIN")), a component associated with the debit card places a block on the debit card.

In addition to monitoring for any suspicious activity and designating one or more gaming establishment accounts and/or a debit card as associated with such activity that occurs, in certain instances, one or more components of one or more systems of the present disclosure disseminate information associated with the activity and/or the designation to one or more other components of one or more other systems. In certain embodiments, the system determines whether or not to disseminate such information and if so, one or more destinations of such information. In these embodiments, since certain actions taken against a gaming establishment account are relatively most relevant to only that gaming establishment account while certain other actions taken against a gaming establishment account and/or a debit card associated with a gaming establishment account are relevant to multiple gaming establishment accounts and/or the debit card, the system determines whether or not the action taken warrants being shared. For example, a determination that a gaming establishment account has reached a maximum allowed balance is generally not relevant to other components of different systems and thus that information is not shared. On the other hand, since a determination that a number of failed attempts to input a correct PIN associated with a debit card has occurred is generally relevant to other components of different systems, that information is shared.

In certain embodiments, upon an occurrence of certain detected activity and/or the placement of a restriction on an account and/or a debit card (e.g., a placement of a block and/or a lock on the account) and a determination to share data associated with such events to other systems, one or more components of one or more systems cause a synchronization to occur which results in other accounts and/or the debit card also being associated with the detected activity and/or the placement of the restriction. In certain embodiments, the component which detects the activity and/or places the restriction propagates the detected activity and/or the placement of the restriction to one or more other components of other systems. In certain other embodiments, the component which detects the activity and/or places the restriction reports the detected activity and/or the placement of the restriction to a component of an event system which operates to make such detected activity and/or the placement of the restriction available to other components of other systems. In certain other embodiments, a component of the event system monitors one or more components of one or more systems for any suspicious activity and/or the placement of any restriction and makes such detected activity and/or the placement of the restriction available to other components of other systems. In these embodiments, the periodic synchronization of the different restriction states (e.g., a locked and/or blocked state versus an unlocked state) and/or the different restriction limits (e.g., limits on a total amount of transactions employing a debit card in a designated period of time) of the different accounts and/or the debit card ensure that such accounts (individually and/or collectively) and/or the debit card remain within the confines of the various jurisdictional requirements as well as banking and anti-money laundering regulations. Accordingly, the system monitors the activities associated with one or more gaming establishment accounts and/or a debit card associated with one or more such accounts and synchronizes information associated with such monitored activities across the various disparate, but interconnected components of the system (which may extend across different sites, different gaming vertical boundaries and/or different non-gaming vertical boundaries) improves user security and reduces the likelihood of fraud when malicious activity occurs or is otherwise being attempted.

In certain embodiments, upon a component of a financial institution, such as a server associated with a bank, receiving a request for a debit card initiated purchase transaction occurring at a gaming establishment or remote from the gaming establishment (e.g., at a retail establishment affiliated with the gaming establishment), the component of the financial institution interacts with a component of a gaming establishment fund management system, such as a server of a cashless wagering system, to potentially fund the purchase transaction. In different embodiments, in association with the attempted purchase transaction, a component of an event system (which may be part of or separate from the gaming establishment fund management system) operates with zero, one or more other systems to determine whether or not any restrictions (e.g., blocks and/or locks associated with the gaming establishment account and/or the debit card) are in place that apply to the debit card initiated purchase transaction. If a determination occurs that one or more restrictions are in place, the component of the gaming establishment fund management system determines whether or not to complete the purchase based on the applicable restriction and/or whether the gaming establishment account has sufficient funds to complete the debit card initiated purchase transaction. If a determination occurs that no restrictions are in place, the component of the gaming establishment fund management system determines whether or not to complete the purchase (e.g., whether the gaming establishment account has sufficient funds using the price of the goods and/or services attempted to be purchased at the retail establishment). In such embodiments, if the component of the gaming establishment fund management system denies the debit card initiated purchase (with or without any applicable restrictions), the component of the gaming establishment fund management system notifies the component of the financial institution to deny the purchase and the component of the financial institution denies the debit card initiated transaction. On the other hand, if the component of the gaming establishment fund management system approves the debit card initiated purchase (with or without any applicable restrictions), the component of the gaming establishment fund management system notifies the component of the financial institution to complete the purchase and the component of the financial institution approves the debit card initiated transaction. In this instance, upon a settlement event, the component of the gaming establishment system funds the debit transaction with funds maintained in association with the gaming establishment. Such a configuration enables restrictions to be in place against one or more gaming establishment accounts and/or a debit card used to access funds in such gaming establishment accounts to reduce occurrences of fraud being propagated against multiple interconnected accounts. Such a configuration further enables funds maintained in a gaming establishment account to be accessed using a debit card issued by a financial institution without the need to first transfer any funds from the gaming establishment account to any separate account, such as a debit card account maintained by the financial institution, and further without the need to wait for any fund transfer to be completed (or alternatively pay various surcharge fees to expedite any fund transfers).

Accordingly, in certain embodiments, the present disclosure provides the synchronization of account restrictions (e.g., account blocks, locks and/or closures) between a pre-paid access instrument (e.g., an open-loop pre-paid debit card) associated with a user's gaming establishment fund management account, such as a debit card associated with a cashless wagering account and the user's gaming establishment fund management account, such as the user's cashless wagering account. Additionally, in certain embodiments, the present disclosure provides the synchronization of account restrictions (e.g., account blocks, locks and/or closures) between an electronic wallet (e.g., a financial transaction application that runs on a mobile device and securely stores payment information, such as debit card information, and passwords to enable the payment of goods and/or services when shopping without the need to carry a debit card around) associated with a pre-paid access instrument (e.g., an open-loop pre-paid debit card) associated with a user's gaming establishment fund management account, such as an electronic wallet associated with a debit card associated with a cashless wagering account and the user's gaming establishment fund management system account, such as the user's cashless wagering account. Moreover, in certain embodiments, the present disclosure provides the synchronization of account restrictions (e.g., account blocks, locks and/or closures) between multiple gaming establishment fund management accounts, such as between a cashless wagering account and a gaming establishment retail account, such that any restrictions associated with one account is published to (and thus available to be placed if applicable) the other accounts.

It should be appreciated that unlike prior payment solutions in which if a user wanted to access their funds held in a casino account at a retail establishment outside of the casino, the user needed to first transfer their funds to a bank account (after which the user can then pay at that retail establishment outside of the casino using a debit card or credit card associated with their bank account), or alternatively first transfer their funds to an electronic wallet (after which the user can use a pre-paid debit card associated with their electronic wallet to pay at that retail establishment outside of the casino), the present disclosure enables a user to maintain their funds in a casino account while still availing themselves of the use of a debit card (issued separate from the casino) for purchases made outside of the casino with the added security benefit of certain restrictions associated with one account and/or the debit card being synchronized to other accounts and/or the debit card. In these different embodiments, by employing the use of funds held in a gaming establishment account to make purchases at a retail establishment subject to any applied restrictions, the system of the present disclosure enables the user to realize the benefits of maintaining funds in a gaming establishment account while still having access to such funds when needed. In other words, by integrating a pre-paid open-loop debit card with funding from one or more gaming establishment accounts, the present disclosure enables such a debit card to function as an interface to remotely access funds from such gaming establishment accounts while offering certain security enhancements for such access. Such a configuration further enables a user with funds in a gaming establishment account, such as a cashless wagering account, to access the network payment processors accessible with a debit card without needing to manually arrange a pre-set transfer of any amounts of funds from the gaming establishment account to another account associated with the debit card to gain such access. This configuration saves users time (e.g., no time needs to be spent transferring funds from a gaming establishment account to a banking account associated with a debit card or waiting a dedicated amount of time for such a transfer to be completed) and offers operational efficiencies (e.g., reducing the number of touchpoints funds must flow through before they may be used) compared to prior payment solutions involving funds in a casino account.

As such and unlike prior systems that required one or more inputs to transfer funds in a gaming establishment account to a banking account associated with a debit card and further required a certain amount of time, such as up to three days, for the transfer to be completed and the transferred funds to become available for use using the debit card, the present disclosure bypasses these external transfers and enables the debit card issuer system to interact, in real time, with the gaming establishment fund management system such that the funds available in a gaming establishment account are available for use employing a debit card as a gateway to such funds. The system of the present disclosure thus offers, in addition to the security and reduced fraud benefits of applicable account restriction synchronization, the benefits of debit card transactions without the fund transfer friction previously encountered in moving funds from a gaming establishment account to a banking account associated with the debit card. Accordingly, in view of the different channels of commerce available both in association with and independent of one or more gaming establishments, the system enables an open loop pre-paid debit card issued by a financial institution to be employed to access funds held in a gaming establishment account and to facilitate the transfer of funds to different accounts associated with different channels of commerce associated with or independent of one or more gaming establishments. Such transfers thus reduce the fund movement friction encountered in using funds held in a gaming establishment account to complete transactions outside of the gaming establishment network while still realizing the benefits of network payment processors offered by the use of debit cards. Such a configuration of employing an open loop pre-paid debit card to access funds maintained in one or more gaming establishment accounts further facilitates, amongst other benefits, a more cashless environment (e.g., cash does not need to be withdrawn from a gaming establishment account and then brought to a retailer, either internal to or external from the gaming establishment, to purchase goods and/or services) which increases safety (e.g., minimizing users having to carry large sums of cash associated with large sums of money and minimizing such cash being a vehicle to spread potentially harmful contagions).

In various embodiments, the present disclosure is directed to a gaming establishment fund management system including various sub-systems that are each associated with or otherwise maintain one or more electronic or virtual accounts. In these embodiments, the various accounts maintained for a user individually or collectively form a resort or enterprise account (i.e., a gaming establishment fund management account) for the user. That is, the collection of cashless wagering accounts (e.g. cashless gaming establishment wagering wallets, cashless sports wagering wallets and/or cashless mobile wagering wallets) and gaming establishment retail accounts (e.g., gaming establishment retail wallets) associated with or otherwise maintained for a user, such as a retail patron, individually or collectively form a resort or enterprise account (i.e., an integrated resort or gaming establishment fund management wallet) that the user may access to transfer funds and/or view balance information amongst the various accounts associated with or otherwise maintained for the user.

In various embodiments, the gaming establishment fund management system includes or is otherwise associated with one or more cashless wagering systems. Each cashless wagering system is associated with or otherwise maintain one or more cashless wagering accounts. In different embodiments, funds held in zero, one or more of these cashless wagering accounts are accessible by (or otherwise configured to be accessible by upon one or more inputs from a user and/or gaming establishment personnel) a debit card associated with such cashless wagering accounts.

In certain embodiments, the gaming establishment fund management system includes a first cashless wagering system that maintains a first cashless wagering account. In these embodiments, a user, such as a player of an electronic gaming machine ("EGM"), utilizes a mobile device application running on a mobile device and/or a physical instrument (e.g., a smart card or a user issued magnetic striped card which the user utilizes via inserting the card into a card reader associated with the EGM) to facilitate the electronic transfer of any funds between this first cashless wagering account and a gaming device, such as a component of a gaming table and/or an EGM (including, but not limited to, a slot machine, a video poker machine, a video lottery terminal, a terminal associated with an electronic table game, a terminal associated with a live table game, a video keno machine, a video bingo, and/or a sports betting terminal (that offers wagering games and/or sports betting opportunities)). For example, as seen in FIG. 1, the gaming establishment fund management system includes a first cashless wagering system (not shown) that maintains a Cashless Wagering Wallet 102 (e.g., a first cashless wagering account) which is in communication with the enterprise wallet 104. In this example, to facilitate the transfer of funds between this cashless wagering account and a credit balance of an EGM 106 and/or a credit balance of a gaming table component (not shown) associated with a gaming table 108, the system utilizes a mobile device 110 running a mobile device application that interfaces with one or more components of the gaming establishment fund management system to enable a user, such as a player of the EGM or a player at the gaming table, access to this first cashless wagering account.

In certain embodiments, the gaming establishment fund management system additionally or alternatively includes or is otherwise associated with a second cashless wagering system that maintains a second cashless wagering account. In these embodiments, funds associated with the second cashless wagering account are utilized to place one or more sporting event wagers and/or wagers placed remote from an EGM and a gaming table. In such embodiments, a user utilizes a mobile device application running on a mobile device and/or a physical instrument (e.g., a smart card or a user issued magnetic striped card which the user utilizes via inserting the card into a kiosk) to facilitate the electronic transfer of any funds between this second cashless wagering account and a credit balance accessible to wager on sporting events and/or games of chance (or games of skill) remote from an EGM and a gaming table. For example, as seen in FIG. 1, the gaming establishment fund management system includes a second cashless wagering system (not shown) that maintains a Sports Wagering Wallet 112 (e.g., a second cashless wagering account) which is in communication with the enterprise wallet 104. In this example, to facilitate the transfer of funds between this cashless wagering account and a credit balance associated with a sporting event wagering system (not shown) and/or a remote wagering system (not shown) to enable the placement of one or more wagers on one or more sporting events and/or one or more games of chance (or games of skill), the system utilizes a mobile device 110 running a mobile device application that interfaces with one or more components of the gaming establishment fund management system to enable, amongst other activities, a user, such as a user remote from the gaming establishment, access to this second cashless wagering account.

In various embodiments, in addition to or an alternative of maintaining one or more cashless wagering accounts via one or more cashless wagering systems, the gaming establishment fund management system includes or is otherwise associated with one or more gaming establishment retail wallet systems that each maintain one or more gaming establishment retail accounts. In different embodiments, funds held in zero, one or more of these gaming establishment retail accounts are accessible by (or otherwise configured to be accessible by upon one or more inputs from a user and/or gaming establishment personnel) a debit card associated with such gaming establishment retail accounts.

In certain embodiments, such a gaming establishment retail account (e.g., a gaming establishment retail wallet) of a gaming establishment retail wallet system integrates with various retail point-of-sale systems throughout the gaming establishment (or located remote from the gaming establishment, but otherwise associated with the gaming establishment) to enable users to purchase goods and/or services via the user's gaming establishment retail account. For example, as seen in FIG. 1, the gaming establishment fund management system includes a gaming establishment retail wallet system (not shown) that maintains a Retail Wallet 114 (e.g., a gaming establishment retail account) which is in communication with the enterprise wallet 104. In this example, to facilitate the transfer of funds between this gaming establishment retail account and an account associated with a gaming establishment retailer to purchase goods and/or services from the gaming establishment retailer, the system utilizes a retail wallet identity, such as a mobile device 110 running a mobile device application that interfaces with a point-of-sale terminal 116 of a retail point-of-sale system 118 of the gaming establishment retailer and/or a physical instrument (e.g., a smart card or a user issued magnetic striped card which the user utilizes in association with the point-of-sale terminal), and one or more components of the gaming establishment fund management system to enable a user access to this gaming establishment retail account. In other embodiments, the gaming establishment fund management system does not maintain a separate gaming establishment retail account, but rather utilizes the gaming establishment retail wallet system as a transaction coordinator to account for any transactions to purchase goods and/or services from a gaming establishment retailer.

In certain embodiments, a gaming establishment retail account is a retail account associated with a user having a balance or a pre-paid access account which, per current regulations from the U.S. Treasury Department Financial Crimes Enforcement Network ("FinCEN"), cannot be convertible to cash and can only be used for the purchase of goods and/or services. In these embodiments, such a gaming establishment retail account integrates with various retail point-of-sale systems of various retail establishments throughout or otherwise associated with a gaming establishment to enable users to purchase goods and/or services via the user's gaming establishment retail account. Accordingly, in certain embodiments, based on one or more jurisdictional regulations, an amount of funds deposited in a gaming establishment retail account may be used with various retail point-of-sale systems throughout the gaming establishment (or remote from, but otherwise associated with the gaming establishment) to enable users to purchase goods and/or services, but such funds deposited in the gaming establishment retail account cannot be converted to cash or check. In certain other embodiments, based on one or more different jurisdictional regulations, an amount of funds deposited in a gaming establishment retail account, such as an account associated with an identified user, may be used with various retail point-of-sale systems throughout the gaming establishment (or remote from, but otherwise associated with the gaming establishment) to enable users to purchase goods and/or services wherein such funds deposited in the gaming establishment retail account may be converted to or otherwise redeemable for cash or check.

In certain embodiments, the gaming establishment fund management system includes or is otherwise in communication with one or more external funding sources which maintain one or more external accounts for the user. For example, as seen in FIG. 1, the gaming establishment fund management system that maintains the enterprise wallet 104 is in communication with an external funding system 120 which is in communication with a network of one or more banks or other financial institutions (i.e., the banking network 122) which operate to electronically transfer funds between the user's accounts maintained at such banks or financial institutions (i.e., bank 124 maintaining an external checking account associated with a debit card and/or a credit card) and one or more of the accounts maintained by the gaming establishment fund management system. As further seen in FIG. 1, in this example, the external funding system 120 is in communication (directly or indirectly via banking network 122) with an external electronic wallet 126 associated with a pre-paid debit card which operates to electronically transfer funds between the user's electronic wallet and one or more of the accounts maintained by the gaming establishment fund management system. In certain embodiments, funds maintained in the accounts of the external funding sources may be transferred to and/or from one or more accounts maintained by the gaming establishment fund management system. These accounts of the external funding sources include, but are not limited to, one or more checking accounts maintained by one or more financial institutions (e.g., one or more banks and/or credit unions), one or more savings accounts maintained by one or more financial institutions, one or more financial institution accounts, such as a brokerage account, maintained by one or more financial institutions, one or more credit card accounts maintained by one or more financial institutions, one or more debit card accounts maintained by one or more financial institutions, and/or one or more third-party maintained accounts (e.g., one or more PayPal® accounts or Venmo® accounts). It should be appreciated that while illustrated as the gaming establishment fund management system being in communication with one or more external funding sources, in different embodiments, any system or sub-system of the present disclosure can be in communication with one or more external funding sources. In different embodiments, the system utilizes a mobile device running a mobile device application, a kiosk or terminal, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to facilitate the transfer of funds to/from an external account.

In certain embodiments, the gaming establishment fund management system includes a debit card issuer system. In certain other embodiments, the gaming establishment fund management system is additionally or alternatively in communication with an external debit card issuer system. In these embodiments, the debit card issuer system issues one or more debit cards for a user. For example, as seen in FIG. 1, the gaming establishment fund management system that maintains the enterprise wallet 104 is in communication with a debit card issuer system (i.e., the enterprise wallet debit card issuer system 128) to facilitate the access of an amount of funds held in one or more gaming establishment accounts via a debit card provided to the user. In this example, as also seen in FIG. 1, the network of one or more banks or other financial institutions (i.e., the banking network 122) is in communication with the debit card issuer system (i.e., the enterprise wallet debit card issuer system 128) to facilitate at least the settlement of funds held in one or more gaming establishment accounts accessed via a debit card provided to the user. It should be appreciated that while illustrated as the gaming establishment fund management system being in communication with one or more debit card issuer systems, in different embodiments, any system or sub-system of the present disclosure can be in communication with one or more debit card issuer systems. It should be further appreciated that in different embodiments, the system utilizes a mobile device running a mobile device application, a kiosk or terminal, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the debit card issuer system.

In certain embodiments, the debit card is independent of any underlying account maintained at any financial institution. Rather, such a debit card operates as an interface to enable a user access to funds held in one or more gaming establishment accounts of the gaming establishment fund management system at one or more channels of commerce associated with the gaming establishment and/or independent of the gaming establishment. In certain other embodiments, the debit card is associated with an account that operates to enable a user just-in-time access to funds held in one or more gaming establishment accounts of the gaming establishment fund management system at one or more channels of commerce associated with the gaming establishment and/or independent of the gaming establishment.

In certain instances, the balance of one or more gaming establishment accounts are drawn down via transactions initiated by the debit card and accessible at a point-of-sale-terminal external from any gaming establishment channel of commerce (e.g., a non-gaming establishment retailer 130 in communication, via the banking network 122, with at least the enterprise wallet debit card issuer system 128). In certain instances, the balance of one or more gaming establishment accounts are drawn down via transactions initiated by the debit card and accessible at a gaming device, such as an EGM 106 and/or a gaming table 108. In certain instances, the balance of one or more gaming establishment accounts are drawn down via transactions initiated by the debit card and accessible at a point-of-sale terminal 116 within a gaming establishment channel of commerce.

In certain embodiments, the gaming establishment fund management system is in communication with one or more event systems that monitor and/or report different events occurring in association with different accounts and/or debit cards utilized in association with debit card transactions occurring at a retail point-of-sale terminal. In certain embodiments, in addition to or alternative from monitoring and/or reporting different events occurring in association with different accounts and/or debit cards, the one or more event systems apply zero, one or more restrictions to one or more accounts and/or debit cards utilized in association with debit card transactions occurring at a retail point-of-sale terminal.

In certain embodiments, the gaming establishment fund management system is integrated with an event system that is employed in the synchronization of different accounts and/or debit cards utilized in association with debit card transactions occurring at a retail point-of-sale terminal. In certain other embodiments, the gaming establishment fund management system is additionally or alternatively in communication with an external event system that is employed in the synchronization of different accounts and/or debit cards utilized in association with debit card transactions occurring at a retail point-of-sale terminal. For example, as seen in FIG. 1, the gaming establishment fund management system that maintains the enterprise wallet 104 is in communication with an event system (i.e., the event system 132) to monitor different events occurring in association with different accounts and/or debit cards utilized in association with debit card transactions, report different events occurring in association with different accounts and/or debit cards utilized in association with debit card transactions, and/or apply zero, one or more restrictions based on different events occurring in association with different accounts and/or debit cards utilized in association with debit card transactions. It should be appreciated that while, in certain embodiments, the gaming establishment fund management system is in communication with one or more event systems, in different embodiments, any system or sub-system of the present disclosure can be in communication with one or more event systems.

In certain embodiments, the event system (and/or another component of another system) applies one or more restrictions responsive to a determination that a restriction placement event occurred or is suspected to have occurred. In certain embodiments, the restrictions applied to one or more accounts and/or debit cards utilized in association with debit card transactions include blocking certain (or all) transactions attempted to be completed in association with such accounts and/or debit cards. In certain embodiments, the restrictions applied to one or more accounts and/or debit cards utilized in association with debit card transactions additionally or alternatively include locking certain of such accounts and/or debit cards. In certain embodiments, the restrictions applied to one or more accounts and/or debit cards utilized in association with debit card transactions additionally or alternatively include closing certain of such accounts and/or debit cards. In different embodiments, such restrictions placed on one or more accounts and/or debit cards include, but are not limited to: (i) a fraud restriction (e.g., an account is blocked due to concern that fraud may have occurred), (ii) a lost restriction (e.g., a user's debit card or player tracking card was lost), (iii) an abandoned restriction (e.g., a user's debit card or player tracking card was abandoned, such as a player tracking card being left in an EGM), (iv) a PIN lock restriction (e.g., too many failed attempts have occurred to validate a PIN associated with a user's debit card or player tracking card), (v) a signature restriction (e.g., a detection that key elements of the user's account may have been altered such that the signature on certain data has failed), (vi) a suspect restriction (e.g., an indication that a gaming establishment patron management system has placed a block on a player tracking card due to possible suspicious activity), and (vii) a maximum balance restriction (e.g., a user's account has the maximum allowed balance).

In certain embodiments, the determination to place any restrictions and/or the attributes of such restrictions is based on one or more actions (or inactions) of a user. In one such embodiment, an identified user makes one or more inputs to place a restriction on one or more gaming establishment accounts associated with the user and/or a debit card associated with one or more of such accounts. In certain embodiments, the determination to place any restrictions and/or the attributes of such restrictions is additionally or alternatively based on an identity of the user. In one such embodiment, different restrictions are placed in association with different users having different status with the gaming establishment. In another such embodiment, different restrictions are placed in association with different users having different responsible gaming limits. In certain embodiments, the system additionally or alternatively determines to place any restrictions and/or the attributes of such restrictions based on a user's wagering activity. In another such embodiment, the system additionally or alternatively determines to place any restrictions and/or the attributes of such restrictions based on a user's gaming establishment retail purchasing activity. In certain embodiments, the system additionally or alternatively determines to place any restrictions and/or the attributes of such restrictions based on a user's collective experience at the gaming establishment. In another such embodiment, the system additionally or alternatively determines to place any restrictions and/or the attributes of such restrictions based on a user's retail purchasing activity occurring independent of the gaming establishment. In another such embodiment, the system determines to place any restrictions and/or the attributes of such restrictions based on determined historical preferences of the user. In another such embodiment, based on actions by a first user different than a second user associated with the gaming establishment account and/or the debit card, the system determines to place a restriction on one or more gaming establishment accounts associated with the second user and/or a debit card associated with one or more of such accounts.

In certain embodiments, the determination to place any restrictions and/or the attributes of such restrictions is additionally or alternatively based on one or more parameters of the gaming establishment. In certain embodiments, a determination to place any restrictions and/or the attributes of such restrictions occurs responsive to one or more inputs received from gaming establishment personnel.

In certain embodiments, a restriction associated with one or more gaming establishment accounts and/or a debit card employed to access funds from one or more of such gaming establishment accounts is associated with one or more qualifying criteria. In these embodiments, prior to a restriction being activated (or deactivated), any qualifying criteria associated with that restriction need to be satisfied. In certain such embodiments, the qualifying criteria pertain to when that restriction may be deactivated. In certain such embodiments, the qualifying criteria additionally or alternatively pertain to the user (and/or gaming establishment personnel) completing one or more activities. In certain embodiments, a restriction associated with one or more gaming establishment accounts and/or a debit card employed to access funds from one or more of such gaming establishment accounts is associated with one or more limits. In these embodiments, prior to a restriction being activated (or deactivated), the gaming establishment fund management system, the debit card issuer system, the retail point-of-sale system and/or the event system determine whether any applicable limits are in place that prevent the restriction from being activated (or deactivated).

In certain embodiments, a restriction associated with one or more gaming establishment accounts and/or a debit card employed to access funds from one or more of such gaming establishment accounts is associated with a specific retail establishment. In certain embodiments, a restriction is associated with a plurality of retail establishments. In certain embodiments, the plurality of retail establishments are associated with each other (e.g., sister stores at different locations or different stores located in the same mall) or independent of each other (e.g., distinct stores located remote from each other). In certain embodiments, a restriction is associated with one or more participating retail establishments within a geographic location. In certain embodiments, the determination to place any restrictions and/or the attributes of such restrictions is additionally or alternatively based on one or more parameters of a retail establishment where a debit card associated with a gaming establishment account is attempted to be used. In one such embodiments, a determination to place any restrictions and/or the attributes of such restrictions occurs responsive to one or more inputs received from personnel associated with the retailer. In certain embodiments, the restrictions placed on one or more gaming establishment accounts and/or a debit card employed to access funds from one or more of such gaming establishment accounts are based on an identity of the retailer. In these embodiments, the gaming establishment fund management system, the debit card issuer system, the retail point-of-sale system and/or the event system imposes, using a Merchant Category Code (MCC) or a whitelist or blacklist of retailers, restrictions on one or more gaming establishment accounts and/or a debit card employed to access funds from one or more of such gaming establishment accounts.

In certain embodiments, the restriction placed on one or more gaming establishment accounts and/or a debit card employed to access funds from one or more of such gaming establishment accounts are additionally or alternatively associated with the type of good and/or service associated with a transaction. In these embodiments, certain types of retail purchases trigger the placement of one or more restrictions while other types of retail purchases do not trigger such restrictions. In certain embodiments, the restriction placed on one or more gaming establishment accounts and/or a debit card employed to access funds from one or more of such gaming establishment accounts are additionally or alternatively based on a location of the retail purchase attempted to be made. In certain embodiments, the restriction placed on one or more gaming establishment accounts and/or a debit card employed to access funds from one or more of such gaming establishment accounts is additionally or alternatively based on a channel of commerce (in certain instances determined via the merchant identifier of the retail establishment) in which one or more transactions are in. In certain embodiments, the restriction placed on one or more gaming establishment accounts and/or a debit card employed to access funds from one or more of such gaming establishment accounts is additionally or alternatively based on a time of when a transaction is attempted to be made. In certain embodiments, the restriction placed on one or more gaming establishment accounts and/or a debit card employed to access funds from one or more of such gaming establishment accounts is additionally or alternatively based on an amount of funds currently maintained in a gaming establishment fund management account associated with a user. In certain embodiments, the restriction placed on one or more gaming establishment accounts and/or a debit card employed to access funds from one or more of such gaming establishment accounts is additionally or alternatively based on a current rate of consumption of the funds in one or more gaming establishment accounts maintained for the user. It should be appreciated that in different embodiments, the system employs a combination of these factors in determining whether or not to place any restrictions and/or the attributes of any restrictions placed.

In certain embodiments, if one or more components of one or more systems determine to associate one or more restrictions with one or more gaming establishment accounts and/or a debit card employed to access funds from one or more of such gaming establishment accounts, a component of such systems, such as a component of the event system, stores restriction information in association with one or more accounts and/or debit cards associated with the user. In one such embodiment, the component of such systems, such as a component of the event system, maintains a restriction database that stores data associated with the different restrictive states of different gaming establishment accounts and/or debit cards. In different embodiments, as the different components of the system are configured to send and/or receive data indicative of restrictions associated with one or more gaming establishment accounts and/or a debit card employed to access funds from one or more of such gaming establishment accounts, certain of such data includes an update time for when sent from a sending component, when received by a receiving component such that the receiving component will compare the timestamp with its own recorded last synchronized time. If the sending component's update time on the data is later than the receiving component's stored last synchronized time, the receiving component will update its own data to ensure that both system components have the most up-to-date data associated with any restrictions associated with one or more gaming establishment accounts and/or a debit card employed to access funds from one or more of such gaming establishment accounts. In different embodiments, the transmission of data associated with any restrictions associated with one or more gaming establishment accounts and/or a debit card employed to access funds from one or more of such gaming establishment accounts may be stand-alone messages between the components of the system or may be included with or otherwise piggy-backed in other messages between components of the system, such as but not limited to balance inquiry messages and funds transfer messages.

In certain embodiments, the gaming establishment fund management system is in communication with one or more gaming establishment patron management systems (e.g., player tracking system 134) that monitor activities at various points of contact associated with the gaming establishment and provides rewards, such as redeemable player tracking points, in association with such activities. It should be appreciated that while, in certain embodiments, the gaming establishment fund management system is in communication with one or more gaming establishment patron management systems, in different embodiments, any system or sub-system of the present disclosure can be in communication with one or more gaming establishment patron management systems. In different embodiments, the system utilizes a mobile device running a mobile device application, a kiosk or terminal, an interface of a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment patron management system.

In certain embodiments (not shown), the gaming establishment fund management system is in communication with one or more credit systems which each issue the user one or more lines of credit. These lines of credit are accessible to facilitate a transfer of funds from the line of credit issued by the credit system to (either directly or indirectly through a cashless wagering account) a credit balance of a gaming device, such as an EGM and/or a gaming table and/or to (either directly or indirectly through a gaming establishment retail account) a point-of-sale terminal (or an account associated with the point-of-sale terminal). It should be appreciated that the gaming establishment fund management system may be in communication with one or more credit systems, and in different embodiments, any system or sub-system of the present disclosure can be in communication with one or more credit systems. It should be further appreciated that in different embodiments, the system utilizes a mobile device running a mobile device application, a kiosk or terminal, a gaming device (e.g., an interface of an EGM or gaming table component), a service window displayed by a gaming device (e.g., a remote host controlled service window displayed by an EGM), a component of a gaming establishment patron management system, such as a player tracking unit, and/or a gaming establishment interface to interface with the gaming establishment credit system.

In certain embodiments (not shown), the gaming establishment fund management system is also in communication with one or more credit reporting/credit risk systems which monitor and report on various accounts associated with the user. For example, the gaming establishment fund management system that maintains the enterprise wallet is in communication with one or more credit reporting and risk systems. These credit reporting and risk systems monitor and report on a credit rating and status of one or more accounts maintained for the user at various funding sources, such as various financial institutions. It should be appreciated that while, in certain embodiments, the gaming establishment fund management system being in communication with one or more credit reporting networks and one or more credit reporting/credit risk systems, in different embodiments, any system or sub-system of the present disclosure can be in communication with one or more credit reporting/credit risk systems.

In certain embodiments, the system utilizes one mobile device application to interact with the different components of the gaming establishment fund management system to, amongst other actions, access funds maintained in the different gaming establishment accounts associated with the user. For example, utilizing the same mobile application, a mobile device interacts with both the first cashless wagering system of the gaming establishment fund management system and the gaming establishment retail wallet system of the gaming establishment fund management system. In certain embodiments, the system utilizes multiple mobile device applications to interact with the different components of the gaming establishment fund management system to, amongst other actions, access funds maintained in the different gaming establishment accounts associated with the user. In certain of these embodiments, the mobile device applications include a location based digital wallet enabled application, such as a Passbook-enabled or Wallet-enabled application, which is accessible when the user enters a gaming establishment. In certain of such embodiments, the mobile device applications are downloaded to the mobile device from an application store. In certain of such embodiments, the mobile device applications are downloaded to the mobile device from one or more websites affiliated with the gaming establishment (which are accessible directly by the user and/or by a link opened when the user scans a QR code).

It should be appreciated that in different embodiments, in addition to or alternatively from utilizing a mobile device running a mobile device application to, amongst other actions, access funds associated with different gaming establishment accounts, the system utilizes a kiosk, a gaming device (e.g., an interface of an EGM or gaming table component), a service window displayed by a gaming establishment device (e.g., a remote host controlled service window displayed by an EGM), a display device/input device associated with a seat-level gaming table component, a display device/input device associated with a table-level gaming table component, a display device/input device associated with a mobile gaming table component, a component of a gaming establishment patron management system, such as a player tracking unit, a retail point-of-sale terminal, and/or a gaming establishment interface, such as a casino desk, to, amongst other actions, access the funds associated with such gaming establishment accounts. It should be further appreciated that while illustrated in FIG. 1 as using a mobile device running a mobile device application to access funds associated with different gaming establishment accounts (e.g., a cashless wagering account and a gaming establishment retail account) as mentioned above, a physical instrument, such as a smart card or a user issued magnetic striped card may additionally or alternatively be utilized to enable a user access to such gaming establishment account.

In certain embodiments, the system enables a transfer of funds between different accounts maintained by different components associated with different gaming activities and/or non-gaming activities. In these embodiments, the system employs a service for interfacing with the various components to facilitate balance inquiry and transferring funds amongst the different accounts maintained by these various components. In certain embodiments, such a service collects data from various components and utilizes such collected data to provide a singular view of the balances (or a plurality of singular views of different groupings of balances). In certain embodiments, such a service additionally or alternatively provides facilities to enforce rules associated with the different accounts maintained by the various components. In different such embodiments, these rules include, but are not limited to, jurisdictional controls, self-imposed limits, state governmental controls and federal governmental controls, wherein the system provides the logic to determine how, and how much, to transfer from each account of the various interconnected components to satisfy a request for funds while staying within the confines of such rules. In certain embodiments, such a service additionally or alternatively tracks and coalesces transaction history across the accounts of the interconnected components of the system. In these embodiments, all transactions within the system have a "master" transaction record that ties all of the various fund transfers to a single initiating funds transfer regardless of how many accounts were withdrawn to the satisfy the original request.

In various embodiments, a component of the event system operates with zero, one or more components of other systems, such as a component of the gaming establishment fund management system, a component of the debit card issuer system and/or a component of a retail point-of-sale system to determine if any restrictions have been placed on any accounts and/or debit cards and potentially propagate such restrictions to other components of other systems (or subsystems). In certain such embodiments, the determination of whether or not to notify other systems is based on the nature of the restriction and the extent to which that restriction may potentially impact other systems. For example, if a server of a cashless wagering system determines that a restriction has been placed on a cashless wagering account because the cashless wagering account has reached a maximum allowed balance, since alerting other systems of this restriction is deemed unnecessary for the proper processing of the other systems, the server of the cashless wagering system determines not to share information regarding this restriction. In another example, if a server of a cashless wagering system determines that a restriction has been placed on a cashless wagering account because too many failed attempts have occurred to validate a PIN associated with the cashless wagering account, since alerting other systems of this security risk and corresponding restriction is deemed necessary, the server of the cashless wagering system determines to share information regarding this restriction.

In certain embodiments, this sharing of information by one system includes a component of that system generating an event upon an occurrence of a restriction being placed on the gaming establishment account and/or debit card associated with that system, and a subscribing system, such as the event system, then performing some action upon the receipt of a restriction change event. For example, if a component of a cashless wagering system places and/or detects a restriction on an account maintained by the cashless wagering system, the component of the cashless wagering system publishes an event to a component of the event system. In this example, a component of the debit card issuer system receives, from the event system, data associated with this change event pertaining to the restriction placed on the cashless wagering account. The component of the debit card issuer system then records that the user's debit card (which is associated with the cashless wagering account to draw funds from) is also placed in a restrictive state, thereby preventing any debit card transactions from being processed using that debit card. It should be appreciated that while this example describes the component of the debit card issuer system placing one or more restrictions based on the event occurring in association with the cashless wagering account, other components of other systems, such as a component of an eWallet system or a component of a gaming establishment retail account system, are each configured to additionally or alternatively place one or more restrictions based on the events reported to the event system (and/or events monitored by the event system).

Accordingly, in various embodiments, responsive to an occurrence of a material event that warrants heightened security (i.e., a restriction placement event), the system of the present disclosure enables a restriction to be placed by a first component of a first system and that first component of the first system to directly (or indirectly, such as via a component of an event system) notify other components of other systems which may then modify one or more restrictions placed on the accounts and/or payment instruments maintained by such other systems. In one such example, as seen in FIG. 2 (which illustrates the described interactions between a gaming establishment patron management system, a gaming establishment fund management system, the event system and the debit card issuer system), if it is detected that too many invalid PIN attempts have been made in association with a player tracking account, a player tracking system (i.e., the gaming establishment patron management system) that maintains the player tracking account places a block (i.e., a restriction) on the player tracking account for security reasons and updates the state of the player tracking account to record the block. The player tracking system then notifies the cashless wagering system (i.e., the component of the gaming establishment fund management system) to modify the user's cashless wagering account (i.e., the enterprise wallet) to be placed in a restrictive state. In this example, the cashless wagering system will update the account status to record the block, thereby preventing any cashless transfers while the block is active. The cashless wagering system will also publish to the event system an account restriction event (e.g., the PIN Lock event) so that other subscribers, such as the debit card issuer system, can learn about the account restriction event. In this example, upon receipt of data associated with the account restriction event, the debit card issuer system will determine if the user referenced in the account restriction event has a debit card issued, and if so, the debit card issuer system will update the restrictive state of the debit card to prevent new purchase transactions (while, in certain instances, still permitting refund transactions).

In certain embodiments, in addition to or alternative from the restriction originating from a component of a gaming establishment system, one or more account restrictions may originate from a component of the debit card issuer system. In these embodiments, responsive to an occurrence of a material event that warrants heightened security (i.e., a restriction placement event), the component of the debit card issuer system applies one or more restrictions and then directly (or indirectly, such as via a component of an event system) notifies one or more components of one or more gaming establishment systems which may then modify one or more restrictions placed on the gaming establishment accounts maintained by such gaming establishment systems. In one such example, as seen in FIG. 3 (which illustrates the described interactions between a gaming establishment patron management system, a gaming establishment fund management system, the event system and the debit card issuer system), if a lock (i.e., a restriction) occurs in association with a debit card because too many invalid or incorrect PIN attempts to access funds in a user's cashless wagering account (i.e., the enterprise wallet) using the linked pre-paid debit card, the debit card issuer system places a restriction on the debit card and publishes an account restriction event (e.g., the PIN Lock event) to the event system so that other subscribers, such as the cashless wagering system, can learn about the account restriction event and place one or more account restrictions as deemed appropriate. In another embodiment, the debit card issuer system (or any component of any system with data associated with one or more placed restrictions to share) notifies one or more other components of other systems directly, such as via a direct application programming interface ("API") call (e.g., such as a REST API call). In this embodiment, upon receiving the directed API call, the other components of other systems may place one or more account restrictions as deemed appropriate.

In certain embodiments, in addition to one or more components of one or more system placing one or more account restrictions to, among other benefits, reduce the likelihood of one or more frauds occurring in association with such accounts, such components of such systems enable these account restrictions to be lifted or otherwise removed. In these embodiments, responsive to a user's successful request (e.g., a user interfaces with gaming establishment personnel to successfully clear or resolve an account restriction or a user makes one or more inputs to a gaming establishment interface to successfully clear or resolve an account restriction) or upon a determination that the restriction is no longer applicable, one or more components of one or more systems lift or otherwise remove the restriction in place and propagate data associated with such a restrictive state change to other components of other systems to also update one or more restrictive states of one or more accounts and/or debit cards. In certain of these embodiments, one or more of the restrictions may be overridden and/or adjusted by qualifying gaming establishment personnel, qualifying retail personnel and/or qualifying debit card issuer personnel. In certain such embodiments, the gaming establishment fund management system, the debit card issuer system, the retail point-of-sale system and/or the event system associates different levels of overriding and/or adjusting restrictions with different qualifying gaming establishment personnel, qualifying retail personnel and/or qualifying debit card issuer personnel.

Accordingly, in various embodiments, responsive to an occurrence of an event that warrants deescalated security, the system of the present disclosure enables a restriction to be removed by a first component of a first system and that first component of the first system to directly (or indirectly, such as via a component of an event system) notify other components of other systems which may then modify, such as also remove, one or more restrictions placed on the accounts and/or payment instruments maintained by such other systems. In one such example, as seen in FIG. 4 (which illustrates the described interactions between a user, gaming establishment personnel operating at a gaming establishment workstation, a gaming establishment patron management system, a gaming establishment fund management system, an event system and a debit card issuer system), if a user successfully interfaces with gaming establishment personnel to cause a block (i.e., a restriction) associated with a player tracking account to be lifted or cleared, the player tracking system (i.e., the gaming establishment patron management system) that maintains the player tracking account is instructed of this cleared restriction. The gaming establishment patron management system will update the state of the player tracking account to record the removal of the block, and then notify the gaming cashless wagering system to modify the user's cashless wagering account (i.e., the enterprise wallet) to also clear a restriction placed on the user's cashless wagering account. In this example, the cashless wagering system will also update the account status to record the cleared block, thereby enabling cashless transfers to occur again. The cashless wagering system will also publish to the event system a cleared account restriction event (e.g., the PIN Lock Cleared event) so that other subscribers, such as the debit card issuer system, can learn about the cleared account restriction event. In this example, upon receipt of data associated with the cleared account restriction event, the debit card issuer system will determine if the user referenced in the cleared account restriction event has a debit card issued, and if so, the debit card issuer system will update the restrictive state of the debit card to enable new purchase transactions using the debit card linked to the user's cashless wagering account.

In certain embodiments, in addition to potentially placing one or more restrictions on one or more gaming establishment accounts and/or debit cards employed to access funds from one or more of such gaming establishment accounts, the system enables a user to attempt to make certain retail transactions using that debit card. In these embodiments, prior to enabling a user to purchase goods and/or services using a debit card with funds in a gaming establishment fund management account, a user must first open such an account (if needed) and procure a debit card. In one such embodiment, the debit card takes the form of a physical instrument (e.g., a smart card that stores information or a magnetic striped debit card that stores information). In another such embodiment, the debit card additionally or alternatively takes the form of a virtual instrument (e.g., a mobile device application and/or a component of a mobile device operating system that stores account information and is operable with a point-of-sale terminal). In these embodiments, utilizing an interface, such as a mobile device application being executed by a mobile device, and/or a website accessed from a browser, the user attempts to open a gaming establishment account and/or obtain a debit card through one or more interactive forms. For example, as part of opening a cashless wagering account, a user (whom has already logged into one or more gaming establishment fund management system accounts via a mobile device application) makes one or more inputs via an interface to provide certain user identifying information, such as, but not limited to, additional address details, a social security number and/or a mother's maiden name, and/or certain anticipated spending information, such as how the user intends to spend the funds withdrawn from such an account if opened. In certain embodiments, the system enables a user to enroll or otherwise sign up for such accounts via other avenues, such as via picking up an application at various locations, via a mobile application running on a mobile device, via a point-of-sale terminal, via an EGM, via a kiosk and/or via adding a gaming establishment fund management account to an existing patron account, such as a player tracking account.

Following the gaming establishment fund management system and/or the debit card issuer system determining to authorize the user to make retail purchases using a debit card to access funds maintained in a gaming establishment account (and subject to zero, one or more applicable restrictions in place), and following any required acknowledgement by the user of any required terms and conditions associated with using funds residing in a gaming establishment fund management account to purchase goods and/or services, the gaming establishment fund management system and/or the debit card issuer system notifies the user, if applicable, regarding the ways the user may pay for retail purchases utilizing a debit card to access funds in a gaming establishment account. For example, the gaming establishment fund management system and/or the debit card issuer system notifies the user, via a message displayed at any suitable device, via an email, via an SMS or text message, and/or via a notification displayed by a mobile device application.

In certain embodiments, to employ a debit card to facilitate the use of funds from a gaming establishment account to an account associated with a retailer to purchase goods and/or services from the retailer, the user presents the debit card to potentially access the funds in the gaming establishment account for the purchase transaction. In different embodiments, the presented debit card takes the form of one or more of a smart debit card that stores gaming establishment account information, a magnetic striped debit card that stores gaming establishment account information, a smart debit card that does not store any gaming establishment account information but is associated with a debit card number that is associated with gaming establishment account information in one or more maintained databases, a magnetic striped debit card that does not store any gaming establishment account information but is associated with a debit card number that is associated with gaming establishment account information in one or more maintained databases, a mobile device application that stores gaming establishment account information, and/or a mobile device application that does not store any gaming establishment account information but is associated with a debit card number that is associated with gaming establishment account information in one or more maintained databases.

In certain such embodiments wherein the debit card is presented in virtual or electronic form using a mobile device application, such as an electronic wallet that stores debit card data, the mobile device application prompts the user to cause the mobile device to engage the point-of-sale terminal, such as prompting the user to tap the mobile device to a designated portion of the point-of-sale terminal (or otherwise moving the mobile device to within a designated distance of a designated location of the point-of-sale terminal). Such engagement initiates a pairing or linkage between the mobile device and the point-of-sale terminal, wherein the pairing or linkage between the mobile device and the point-of-sale terminal occurs via one or more applications being run or executed on the mobile device. In this example, after such engagement, the mobile device application communicates, via a wireless communication protocol (including, but not limited to: Bluetooth™, Bluetooth™ Low Energy ("BLE"), one or more cellular communication standards (e.g., 3G, 4G, 5G, 6G, LTE), one or more Wi-Fi compatible standards, and one or more short range communication protocols (e.g., a near field communication ("NFC") protocol), data associated with the debit card to the point-of-sale terminal to facilitate the potential purchase of goods and/or services.

It should be appreciated that in certain embodiments, the user needs to take one or more steps to approve a transaction to access funds in a gaming establishment account using a debit card. In one such embodiment, the user acknowledges the approval of accessing funds in a gaming establishment account using a debit card, when needed, by entering PIN via a mobile device application, providing a signature and/or presenting a biometric identifier to a mobile device. In another embodiment, the user acknowledges the approval of accessing funds in a gaming establishment account using a debit card, when needed, by entering a PIN, providing a signature and/or presenting a biometric identifier to the retail point-of-sale terminal or a peripheral device associated with the retail point-of-sale terminal.

In various embodiments, upon the presentation of the debit card at an applicable point-of-sale terminal of a retail point-of-sale system, the components of the systems individually or collectively determine whether or not any restrictions are in place and also whether or not to complete the attempted retail purchase using funds maintained in a gaming establishment account.

Figure 5:
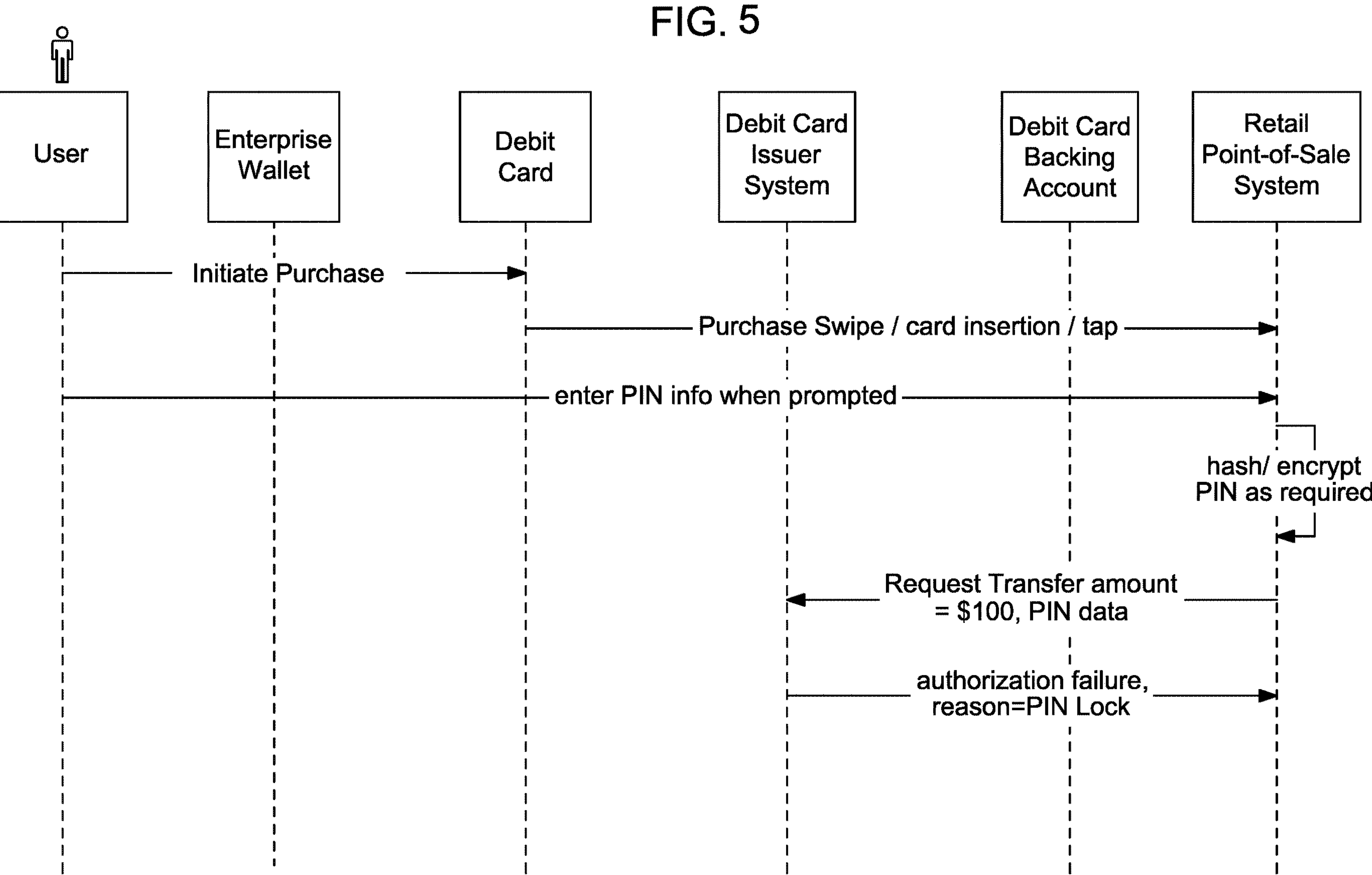
FIG. 5 is a flow chart of an example process for operating a system which enables any applicable restriction to factor into the processing of a purchase at a retail establishment made using a debit card associated with a gaming establishment account.

In certain such embodiments, if the system determines that one or more restrictions are in place, the system denies or prevents the attempted transaction from occurring with minimal involvement of the gaming establishment fund management system. For example, as seen in FIG. 5 (which illustrates the described interactions between the user, the gaming establishment fund management system, the debit card issuer system, and the retail point-of-sale system), following the presentation of the debit card to a retail point-of-sale system, if the debit card issuer system determines that a restriction is in place on one or more gaming establishment accounts and/or the debit card employed to access funds from one or more of such gaming establishment accounts, the debit card issuer system interfaces with the retail point-of-sale system to deny the attempted purchase transaction and communicate information to the retail point-of-sale system regarding this automatic denial (due to the placed restriction).

In certain other embodiments, upon receiving data or information regarding the debit card, the retail point-of-sale system communicates with the debit card issuer system to request a transfer of an amount of funds to cover the cost of the intended purchase. The debit card issuer system in turn operates with the gaming establishment fund management system and the event system to determine the applicability of any restrictions placed on the gaming establishment account which the funds for the purchase will be drawn from and/or placed on the debit card.

If the debit card issuer system, the gaming establishment fund management system and/or the event system determine that an applicable restriction is in place that prevents the completion of the transaction, the gaming establishment fund management system (and/or other component that determines that the transaction cannot be completed due to the restriction in place) denies this sale transaction of the goods and/or services using the gaming establishment account. One or more denial messages of the sale transaction of the goods and/or services using the gaming establishment account are communicated to the debit card issuer system which communicates such denial messages to the retail point-of-sale system.

If the debit card issuer system, the gaming establishment fund management system and/or the event system determine the inapplicability of any restrictions (i.e., no restrictions are currently in place or any restrictions currently in place will not prevent the transaction from potentially be completed), the gaming establishment fund management system determines if the gaming establishment account has adequate funds for the intended purchase. In these embodiments, upon the requested transfer of funds to complete the debit card facilitated retail purchase using funds in a gaming establishment account, the gaming establishment fund management system logs the user into the gaming establishment account associated with the user (if necessary) and determines whether to authorize the transfer of an amount of funds necessary to complete the transaction. That is, if no applicable restriction is in place that prevents the completion of the transaction, the component of the gaming establishment fund management system (e.g., one or more servers of the gaming establishment fund management system) determines whether the gaming establishment account includes an amount of funds at least equal to the amount of funds to complete the transaction.

If the gaming establishment fund management system indicates that the gaming establishment account lacks adequate funds for the purchase, the gaming establishment fund management system denies this sale transaction of the goods and/or services using the gaming establishment account. One or more denial messages of the sale transaction of the goods and/or services using the gaming establishment account are communicated to the debit card issuer system which communicates such denial messages to the retail point-of-sale system. On the other hand, if the gaming establishment fund management system confirms the presence of adequate funds in the gaming establishment account, the gaming establishment fund management system authorizes the sale of the goods and/or services. The gaming establishment fund management system then proceeds to modify a balance of the gaming establishment account to reflect a debit to cover the purchased goods and/or services. In addition to reducing a balance of the gaming establishment account, the gaming establishment fund management system communicates one or more authorization messages of the sale transaction of the goods and/or services to the debit card issuer system which communicates such authorization messages to the retail point-of-sale system to complete the sale of the goods and/or services. Such a completed purchase of the goods and/or services is associated with a transaction identification which one or more components of the system store for reporting purposes.

In certain embodiments, the amount to cover the purchased goods and/or services with funds in the gaming establishment account are subsequently transferred, as part of a settlement process, from a backing account associated with the gaming establishment account to a retailer bank account associated with the retailer. In these embodiments, while the use of a debit card to access funds associated with a gaming establishment account includes the gaming establishment fund management system modifying the balance of the gaming establishment account based on such debit card facilitated access, the settlement of such funds with the retailer occurs upon a settlement event. In different embodiments, such a settlement event occurs automatically at a preset interval or point in time, automatically in real time, and/or responsive to one or more inputs received to initiate the settlement event. In operation, upon an occurrence of the settlement event, a financial institution associated with the gaming establishment fund management system operates with a financial institution associated with the retailer to cause a transfer of an amount of funds between the gaming establishment account maintained by the gaming establishment fund management system and the financial institution account associated with the retailer. In these embodiments, since certain jurisdictions require that the amount of funds associated with one or more gaming establishment accounts maintained by a gaming establishment fund management system for one or more users are secured by a corresponding amount of funds in one or more financial institution accounts for the gaming establishment, to account for the debit card facilitated use of funds flowing to and/or from such a gaming establishment account, the system causes, either in association with each debit card facilitated transaction or in association with a plurality of debit card facilitated transactions, the transfer of funds between the different financial institution accounts associated with the gaming establishment and the retailer where the debit card was used. Such settlement transfers not only ensure that the retailer is paid for the goods and/or services purchased using the debit card (or alternative the user is credited for the refund transaction associated with the credit card), but such settlement transfers further ensure that the amounts maintained in the gaming establishment account maintained by the gaming establishment comply with jurisdictional requirements by corresponding with the amounts maintained in the one or more associated financial institution accounts.

It should be thus appreciated that unlike prior payment solutions in which if a user wanted to access their funds held in a casino account at a retail establishment outside of the casino, the user needed to first transfer their funds to a bank account (after which the user can then pay at that retail establishment outside of the casino using a debit card or credit card associated with their bank account), or alternatively first transfer their funds to an electronic wallet (after which the user can use a pre-paid debit card associated with their electronic wallet to pay at that retail establishment outside of the casino), the present disclosure enables a user to maintain their funds in a casino account while still availing themselves of the use of a debit card (issued separate from the casino) for purchases made outside of the casino with the added benefit of increased security via the synchronization of any restrictions across multiple accounts maintained by multiple components. In these different embodiments, by reducing instances of fraud via the employment of restriction data communicated between different systems and by employing the use of funds held in a gaming establishment account to make purchases at a retail establishment, the system of the present disclosure enables the user to realize the benefits of maintaining funds in a gaming establishment account while still having access to such funds when needed. In other words, by integrating a pre-paid open-loop debit card with funding from one or more gaming establishment accounts, the present disclosure enables such a debit card to function as an interface to remotely access funds from such gaming establishment accounts without sacrificing security if any restrictions are in place. Such a configuration further enables a user with funds in a gaming establishment account, such as a cashless wagering account, to access the network payment processors accessible with a debit card without needing to manually arrange a pre-set transfer of any amounts of funds from the gaming establishment account to another account associated with the debit card to gain such access. This configuration saves users time (e.g., no time needs to be spent transferring funds from a gaming establishment account to a banking account associated with a debit card or waiting a dedicated amount of time for such a transfer to be completed) and offers operational efficiencies (e.g., reducing the number of touchpoints funds must flow through before they may be used) compared to prior payment solutions involving funds in a casino account.

It should be further appreciated that unlike prior systems, the present disclosure bypasses the requirement for external transfers and enables the debit card issuer system to interact, in real time, with the gaming establishment fund management system such that the funds available in a gaming establishment account are available for use employing a debit card as a gateway to such funds. As such, the system of the present disclosure offers, in addition to the benefits of synchronized restrictions (if needed), the benefits of debit card transactions without the fund transfer friction previously encountered in moving funds from a gaming establishment account to a banking account associated with the debit card. Accordingly, in view of the different channels of commerce available both in association with and independent of one or more gaming establishments, the system enables an open loop pre-paid debit card issued by a financial institution to be employed to access funds held in a gaming establishment account and to facilitate the transfer of funds to different accounts associated with different channels of commerce associated with or independent of one or more gaming establishments. Such transfers thus reduce the fund movement friction encountered in using funds held in a gaming establishment account to complete transactions outside of the gaming establishment network while still realizing the security benefits of coordinated restrictions between multiple accounts and network payment processors offered by the use of debit cards. Such a configuration of employing an open loop pre-paid debit card to access funds maintained in one or more gaming establishment accounts further facilitates, amongst other benefits, a more cashless environment (e.g., cash does not need to be withdrawn from a gaming establishment account and then brought to a retailer, either internal to or external from the gaming establishment, to purchase goods and/or services) which increases safety (e.g., minimizing users having to carry large sums of cash associated with large sums of money and minimizing such cash being a vehicle to spread potentially harmful contagions).

In various embodiments, prior to using funds in a gaming establishment account, such as using funds in a gaming establishment account, to purchase goods and/or services using a debit card associated with the gaming establishment account, the system enables the gaming establishment account to be funded from one or more sources. In certain embodiments, the system enables the gaming establishment account to be directly funded from one or more of such sources. In certain embodiments, the system enables the gaming establishment account to be indirectly funded from one or more of such sources, such as by an amount of funds from such sources first being transferred to another gaming establishment account and then such an amount of funds being transferred from the other gaming establishment account to the gaming establishment account.

In certain embodiments, the gaming establishment account is associated with one or more external accounts, such as one or more credit card accounts, one or more debit card accounts and/or one or more third-party maintained accounts (e.g., one or more PayPal® accounts or Venmo® accounts). In certain embodiments, the gaming establishment account is associated with a gaming establishment or a group of gaming establishments, wherein the user establishes a gaming establishment account by a deposit of funds (such as at a kiosk) to be subsequently utilized in association with the mobile device application. In other embodiments, the gaming establishment account is funded via a mobile device electronic fund transfer, such using Apple Pay™ or Android Pay™. It should be appreciated that in different embodiments, the system utilizes a mobile device running a mobile device application, a kiosk, an EGM, a gaming table component, a service window displayed by a gaming device (e.g., a remote host controlled service window displayed by an EGM) and/or a gaming establishment interface to facilitate the transfer of funds from a third-party account. In certain embodiments, the system enables funds to be deposited in a gaming establishment account via activating a line of credit associated with the user.

In certain embodiments, the system enables funds to be deposited in a gaming establishment account, via a gaming device, such as an EGM and/or via a non-gaming device, such as a kiosk. In certain embodiments, the system enables a user that has an amount of cash to utilize a gaming device and/or a non-gaming device to convert the cash to an amount deposited into a gaming establishment account (which may be subsequently transferred utilizing a mobile device application). In other embodiments, the system enables funds to be deposited in a gaming establishment account via a gaming device and/or a non-gaming device that accepts printed ticket vouchers. In these embodiments, the system enables a user that has one or more printed ticket vouchers to utilize a gaming device and/or a non-gaming device to convert the printed ticket voucher to an amount deposited into a gaming establishment account (which may be subsequently transferred utilizing a mobile device application).

In certain embodiments, the system enables funds to be deposited in a gaming establishment account via a gaming establishment interface, such as a gaming establishment cage or desk. In certain embodiments, the system enables a user that has an amount of cash to utilize a gaming establishment interface, such as a gaming establishment cage or desk to convert the cash to an amount deposited into a gaming establishment account (which may be subsequently transferred utilizing a mobile device application). In other embodiments, the system enables funds to be deposited in a gaming establishment account via a gaming establishment interface that accepts printed ticket vouchers. In these embodiments, the system enables a user that has one or more printed ticket vouchers to utilize a gaming establishment interface to convert the printed ticket voucher to an amount deposited into a gaming establishment account (which may be subsequently transferred utilizing a mobile device application).

In certain embodiments, the gaming establishment account is associated with funds associated with one or more virtual ticket vouchers. In certain embodiments, the system enables a user associated with an amount of virtual ticket vouchers to utilize a gaming device (e.g., an EGM, or a component of an EGM), a non-gaming device (e.g., a kiosk), a mobile device running a mobile device application, and/or a gaming establishment interface to convert the virtual ticket vouchers to an amount deposited into a gaming establishment account.

It should be appreciated that the electronic fund data transfers of the present disclosure may occur in addition to or as an alternative from cash-based fund transfers and/or ticket voucher-based fund transfers. In one such embodiment, an amount of funds transacted at a retail point-of-sale terminal is funded via any of an electronic fund transfer, a cash-based fund transfer or a ticket voucher-based fund transfer. In another embodiment, an amount of funds In another embodiment, an amount of funds transacted at a retail point-of-sale terminal is funded via an electronic fund transfer or a cash-based fund transfer (but is not funded via any ticket voucher-based fund transfer). In another embodiment, an amount of funds transacted at a retail point-of-sale terminal is funded via an electronic fund transfer or a ticket voucher-based fund transfer (but is not funded via any cash-based fund transfer). In another embodiment, an amount of funds transacted at a retail point-of-sale terminal is funded via an electronic fund transfer (but is not funded via a cash-based fund transfer nor a ticket voucher-based fund transfer).

It should be further appreciated that any functionality or process of the present disclosure may be implemented via one or more servers (associated with or independent of any component of any system disclosed herein), one or more non-gaming establishment devices (e.g., a point-of-sale terminal of a retailer located external to and independent of a gaming establishment), a mobile device application, one or more gaming establishment devices (e.g., a gaming device such as an EGM or a non-gaming device such as a point-of-sale terminal of a retailer located within or otherwise associated with a gaming establishment), and/or one or more components of a gaming establishment system (such as a component of a gaming establishment management system supported by or otherwise located inside a gaming establishment device and/or a non-gaming establishment device). Accordingly: (i) while certain functions, features or processes are described herein as being performed by a non-gaming establishment device, such functions, features or processes may alternatively be performed by one or more servers, or one or more mobile device applications, one or more gaming establishment devices, and/or one or more gaming establishment components, and (ii) while certain functions, features or processes are described herein as being performed by one or more servers (e.g., a server of a debit card issuer system, a server of a gaming establishment patron management system, a server of a gaming establishment fund management system, a server of an event system, and/or a server of a retail point-of-sale system), such functions, features or processes may alternatively be performed by one or more gaming establishment devices, one or more components of a gaming establishment system, one or more non-gaming establishment devices, one or more mobile device applications, or one or more gaming establishment components.

In certain embodiments, the above-described embodiments of the present disclosure may be implemented in accordance with or in conjunction with zero, one or more components of a gaming establishment fund management system (e.g., a cashless wagering system or a gaming establishment retail system); zero, one or more components of a debit card issuer system; zero, one or more components of a gaming establishment patron management system; zero, one or more components of an event system; zero, one or more components of a retail point-of-sale system; and/or zero, one or more gaming establishment devices. In these embodiments, such components of the gaming establishment fund management system, the debit card issuer system, the event system, the gaming establishment patron management system, the retail point-of-sale system and/or the gaming establishment device each include a controller including at least one processor.

The at least one processor is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or fund information) via a communication interface of the controller; (2) converting signals read by an interface to a format corresponding to that used by software or memory of the component of the gaming establishment fund management system, the component of the gaming establishment patron management system, the component of the debit card issuer system, the component of the event system, the component of the retail point-of-sale system and/or the gaming establishment device; (3) accessing memory to configure or reconfigure parameters in the memory according to indicia read from the component of the gaming establishment fund management system, the component of the gaming establishment patron management system, the component of the debit card issuer system, the component of the event system, the component of the retail point-of-sale system and/or the gaming establishment device; (4) communicating with interfaces and the peripheral devices (such as input/output devices); and/or (5) controlling the peripheral devices. In certain embodiments, one or more components of the controller (such as the at least one processor) reside within a housing of the component of the gaming establishment fund management system, the component of the gaming establishment patron management system, the component of the debit card issuer system, the component of the event system, the component of the retail point-of-sale system and/or the gaming establishment device, while in other embodiments, at least one component of the controller resides outside of the housing of the component of the gaming establishment fund management system, the component of the gaming establishment patron management system, the component of the debit card issuer system, the component of the event system, the component of the retail point-of-sale system and/or the gaming establishment device.

The controller also includes at least one memory device, which includes: (1) volatile memory (e.g., RAM which can include non-volatile RAM, magnetic RAM, ferroelectric RAM, and any other suitable forms); (2) non-volatile memory (e.g., disk memory, FLASH memory, EPROMS, EEPROMs, memristor-based non-volatile solid-state memory, etc.); (3) unalterable memory (e.g., EPROMs); (4) read-only memory; and/or (5) a secondary memory storage device, such as a non-volatile memory device, configured to store software related information (the software related information and the memory may be used to store various files not currently being used and invoked in a configuration or reconfiguration). Any other suitable magnetic, optical, and/or semiconductor memory may operate in conjunction with the component of the gaming establishment fund management system, the component of the gaming establishment patron management system, the component of the debit card issuer system, the component of the event system, the component of the retail point-of-sale system and/or the gaming establishment device disclosed herein. In certain embodiments, the at least one memory device resides within the housing of the component of the gaming establishment fund management system, the component of the gaming establishment patron management system, the component of the debit card issuer system, the component of the event system, the component of the retail point-of-sale system and/or the gaming establishment device, while in other embodiments at least one component of the at least one memory device resides outside of the housing of the component of the gaming establishment fund management system, the component of the gaming establishment patron management system, the component of the debit card issuer system, the component of the event system, the component of the retail point-of-sale system and/or the gaming establishment device. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device is configured to store, for example: (1) configuration software, such as all the parameters and settings on the component of the gaming establishment fund management system, the component of the gaming establishment patron management system, the component of the debit card issuer system, the component of the event system, the component of the retail point-of-sale system and/or the gaming establishment device; (2) associations between configuration indicia read from the component of the gaming establishment fund management system, the component of the gaming establishment patron management system, the component of the debit card issuer system, the component of the event system, the component of the retail point-of-sale system and/or the gaming establishment device with one or more parameters and settings; (3) communication protocols configured to enable the at least one processor to communicate with the peripheral devices; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the component of the gaming establishment fund management system, the component of the gaming establishment patron management system, the component of the debit card issuer system, the component of the event system, the component of the retail point-of-sale system and/or the gaming establishment device to communicate with local and non-local devices using such protocols. In one implementation, the controller communicates with other devices using a serial communication protocol. A few non-limiting examples of serial communication protocols that other devices, such as peripherals (e.g., a bill validator or a ticket printer), may use to communicate with the controller include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device is configured to store program code and instructions executable by the at least one processor of the component of the gaming establishment fund management system, the component of the gaming establishment patron management system, the component of the debit card issuer system, the component of the event system, the component of the retail point-of-sale system and/or the gaming establishment device to control the component of the gaming establishment fund management system, the component of the gaming establishment patron management system, the component of the debit card issuer system, the component of the event system, the component of the retail point-of-sale system and/or the gaming establishment device. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a retail patron uses such a removable memory device in a component of the gaming establishment fund management system to implement at least part of the present disclosure. In other embodiments, part or all of the program code and/or the operating data is downloaded to the at least one memory device of the component of the gaming establishment fund management system, the component of the gaming establishment patron management system, the component of the debit card issuer system, the component of the event system, the component of the retail point-of-sale system and/or the gaming establishment device through any suitable data network described above (such as an Internet or intranet).

The at least one memory device also stores a plurality of device drivers. Examples of different types of device drivers include device drivers for the component of the gaming establishment fund management system, the component of the gaming establishment patron management system, the component of the debit card issuer system, the component of the event system, the component of the retail point-of-sale system and/or the gaming establishment device and device drivers for the peripheral components. Typically, the device drivers utilize various communication protocols that enable communication with a particular physical device. The device driver abstracts the hardware implementation of that device. For example, a device driver may be written for each type of card reader that could potentially be connected to the component of the gaming establishment fund management system, the component of the gaming establishment patron management system, the component of the debit card issuer system, the component of the event system, the component of the retail point-of-sale system and/or the gaming establishment device. Non-limiting examples of communication protocols used to implement the device drivers include Netplex, USB, Serial, Ethernet, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the component of the gaming establishment fund management system, the component of the gaming establishment patron management system, the component of the debit card issuer system, the component of the event system, the component of the retail point-of-sale system and/or the gaming establishment device loads the new device driver from the at least one memory device to enable communication with the new device. For instance, one type of card reader in the component of the gaming establishment fund management system, the component of the gaming establishment patron management system, the component of the debit card issuer system, the component of the event system, the component of the retail point-of-sale system and/or the gaming establishment device can be replaced with a second different type of card reader when device drivers for both card readers are stored in the at least one memory device.

In certain embodiments, the software units stored in the at least one memory device can be upgraded as needed. For instance, when the at least one memory device is a hard drive, new parameters, new settings for existing parameters, new settings for new parameters, new device drivers, and new communication protocols can be uploaded to the at least one memory device from the controller or from some other external device. As another example, when the at least one memory device includes a CD/DVD drive including a CD/DVD configured to store options, parameters, and settings, the software stored in the at least one memory device can be upgraded by replacing a first CD/DVD with a second CD/DVD. In yet another example, when the at least one memory device uses flash memory or EPROM units configured to store options, parameters, and settings, the software stored in the flash and/or EPROM memory units can be upgraded by replacing one or more memory units with new memory units that include the upgraded software. In another embodiment, one or more of the memory devices, such as the hard drive, may be employed in a software download process from a remote software server.

In some embodiments, the at least one memory device also stores authentication and/or validation components configured to authenticate/validate specified components of the component of the gaming establishment fund management system, the component of the gaming establishment patron management system, the component of the debit card issuer system, the component of the event system, the component of the retail point-of-sale system and/or the gaming establishment device and/or information, such as hardware components, software components, firmware components, peripheral device components, user input device components, information received from one or more user input devices, information stored in the at least one memory device, etc.

In certain embodiments, the peripheral devices include several device interfaces, such as, but not limited to: (1) at least one output device including at least one display device; (2) at least one input device (which may include contact and/or non-contact interfaces); (3) at least one transponder; (4) at least one wireless communication component; (5) at least one wired/wireless power distribution component; (6) at least one sensor; (7) at least one data preservation component; (8) at least one motion/gesture analysis and interpretation component; (9) at least one motion detection component; (10) at least one portable power source; (11) at least one geolocation module; (12) at least one user identification module; (13) at least one user/device tracking module; and (14) at least one information filtering module.

The at least one output device includes at least one display device configured to display any suitable information. In certain embodiments, the display devices are connected to or mounted on a housing of the component of the gaming establishment fund management system, the component of the gaming establishment patron management system, the component of the debit card issuer system, the component of the event system, the component of the retail point-of-sale system and/or the gaming establishment device. In various embodiments, the display devices serve as digital glass configured to aspects of the gaming establishment in which the component of the gaming establishment fund management system, the component of the gaming establishment patron management system, the component of the debit card issuer system, the component of the event system, the component of the retail point-of-sale system and/or the gaming establishment device is located. In various embodiments, the component of the gaming establishment fund management system, the component of the gaming establishment patron management system, the component of the debit card issuer system, the component of the event system, the component of the retail point-of-sale system and/or the gaming establishment device includes zero, one or more of the following display devices: (a) a central display device; (b) a player tracking display configured to display various information regarding a user's player tracking status; (c) a secondary or upper display device in addition to the central display device and the player tracking display; (d) a credit display configured to display a current quantity of credits, amount of cash, account balance, or the equivalent; and (e) a bet display. In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

In various embodiments, the at least one output device includes a payout device. In these embodiments, after the component of the gaming establishment fund management system, the component of the gaming establishment patron management system, the component of the debit card issuer system, the component of the event system, the component of the retail point-of-sale system and/or the gaming establishment device receives an actuation, the component of the gaming establishment fund management system, the component of the gaming establishment patron management system, the component of the debit card issuer system, the component of the event system, the component of the retail point-of-sale system and/or the gaming establishment device causes the payout device to provide a payment to the user. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. In certain embodiments, rather than dispensing bills, coins, or a physical ticket having a monetary value to the user following receipt of an actuation of the cashout device, the payout device is configured to cause a payment to be provided to the user in the form of an electronic funds transfer, such as via a direct deposit into a bank account, a casino account, or a prepaid account of the user; via a transfer of funds onto an electronically recordable identification card or smart card of the user; or via sending a virtual ticket having a monetary value to an electronic device of the user.

In certain embodiments, the at least one output device is a sound generating device controlled by one or more sound cards. In one such embodiment, the sound generating device includes one or more speakers or other sound generating hardware and/or software configured to generate sounds, such as by playing music. In another such embodiment, the component of the gaming establishment fund management system, the component of the gaming establishment patron management system, the component of the debit card issuer system, the component of the event system, the component of the retail point-of-sale system and/or the gaming establishment device provides dynamic sounds coupled with attractive multimedia images displayed on one or more of the display devices to provide an audio-visual representation or to otherwise display full-motion video with sound to attract users to the component of the gaming establishment fund management system, the component of the gaming establishment patron management system, the component of the debit card issuer system, the component of the event system, the component of the retail point-of-sale system and/or the gaming establishment device. In certain embodiments, the component of the gaming establishment fund management system, the component of the gaming establishment patron management system, the component of the debit card issuer system, the component of the event system, the component of the retail point-of-sale system and/or the gaming establishment device displays a sequence of audio and/or visual attraction messages during idle periods to attract potential users to the component of the gaming establishment fund management system, the component of the gaming establishment patron management system, the component of the debit card issuer system, the component of the event system, the component of the retail point-of-sale system and/or the gaming establishment device. The videos may be customized to provide any appropriate information.

The at least one input device may include any suitable device that enables an input signal to be produced and received by the at least one processor of the component of the gaming establishment fund management system, the component of the gaming establishment patron management system, the component of the debit card issuer system, the component of the event system, the component of the retail point-of-sale system and/or the gaming establishment device. In one embodiment, the at least one input device includes a payment device configured to communicate with the at least one processor of the component of the gaming establishment fund management system, the component of the gaming establishment patron management system, the component of the debit card issuer system, the component of the event system, the component of the retail point-of-sale system and/or the gaming establishment device to fund the component of the gaming establishment fund management system, the component of the gaming establishment patron management system, the component of the debit card issuer system, the component of the event system, the component of the retail point-of-sale system and/or the gaming establishment device. In certain embodiments, the payment device includes zero, one or more of: (a) a bill acceptor into which paper money is inserted; (b) a ticket acceptor into which a ticket or a voucher is inserted; (c) a reader or a validator for credit cards, debit cards, or credit slips into which a credit card, debit card, or credit slip is inserted; (d) a player identification card reader into which a player identification card is inserted; or (e) any suitable combination thereof. In one embodiment, the at least one input device includes a payment device configured to enable the component of the gaming establishment fund management system, the component of the gaming establishment patron management system, the component of the debit card issuer system, the component of the event system, the component of the retail point-of-sale system and/or the gaming establishment device to be funded via an electronic funds transfer, such as a transfer of funds from a bank account. In another embodiment, the component of the gaming establishment fund management system, the component of the gaming establishment patron management system, the component of the debit card issuer system, the component of the event system, the component of the retail point-of-sale system and/or the gaming establishment device includes a payment device configured to communicate with a mobile device of a user, such as a mobile phone, a radio frequency identification tag, or any other suitable wired or wireless device, to retrieve relevant information associated with that user to fund the component of the gaming establishment fund management system, the component of the gaming establishment patron management system, the component of the debit card issuer system, the component of the event system, the component of the retail point-of-sale system and/or the gaming establishment device. When the component of the gaming establishment fund management system, the component of the gaming establishment patron management system, the component of the debit card issuer system, the component of the event system, the component of the retail point-of-sale system and/or the gaming establishment device is funded, the at least one processor determines the amount of funds entered and displays the corresponding amount.

In various embodiments, the at least one input device includes a plurality of buttons that are programmable by the component of the gaming establishment fund management system, the component of the gaming establishment patron management system, the component of the debit card issuer system, the component of the event system, the component of the retail point-of-sale system and/or the gaming establishment device operator to, when actuated, cause the component of the gaming establishment fund management system, the component of the gaming establishment patron management system, the component of the debit card issuer system, the component of the event system, the component of the retail point-of-sale system and/or the gaming establishment device to perform particular functions. For instance, such buttons may be hard keys, programmable soft keys, or icons icon displayed on a display device of the component of the gaming establishment fund management system, the component of the gaming establishment patron management system, the component of the debit card issuer system, the component of the event system, the component of the retail point-of-sale system and/or the gaming establishment device that are actuatable via a touch screen of the component of the gaming establishment fund management system, the component of the gaming establishment patron management system, the component of the debit card issuer system, the component of the event system, the component of the retail point-of-sale system and/or the gaming establishment device or via use of a suitable input device of the component of the gaming establishment fund management system, the component of the gaming establishment patron management system, the component of the debit card issuer system, the component of the event system, the component of the retail point-of-sale system and/or the gaming establishment device. In certain embodiments, the at least one input device includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the component of the gaming establishment fund management system, the component of the gaming establishment patron management system, the component of the debit card issuer system, the component of the event system, the component of the retail point-of-sale system and/or the gaming establishment device by touching the touch screen at the appropriate locations.

The at least one wireless communication component includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component transmits electrical, electromagnetic, or optical signals that carry digital data streams or analog signals representing various types of information.

The at least one wired/wireless power distribution component includes components or devices that are configured to provide power to other devices. For example, in one embodiment, the at least one power distribution component includes a magnetic induction system that is configured to provide wireless power to one or more user input devices near the component of the gaming establishment fund management system, the component of the gaming establishment patron management system, the component of the debit card issuer system, the component of the event system, the component of the retail point-of-sale system and/or the gaming establishment device. In one embodiment, a user input device docking region is provided, and includes a power distribution component that is configured to recharge a user input device without requiring metal-to-metal contact. In one embodiment, the at least one power distribution component is configured to distribute power to one or more internal components of the component of the gaming establishment fund management system, the component of the gaming establishment patron management system, the component of the debit card issuer system, the component of the event system, the component of the retail point-of-sale system and/or the gaming establishment device, such as one or more rechargeable power sources (e.g., rechargeable batteries) located at the component of the gaming establishment fund management system, the component of the gaming establishment patron management system, the component of the debit card issuer system, the component of the event system, the component of the retail point-of-sale system and/or the gaming establishment device.

In certain embodiments, the at least one sensor includes at least one of: optical sensors, pressure sensors, RF sensors, infrared sensors, image sensors, thermal sensors, and biometric sensors. The at least one sensor may be used for a variety of functions, such as: detecting movements and/or gestures of various objects within a predetermined proximity to the component of the gaming establishment fund management system, the component of the gaming establishment patron management system, the component of the debit card issuer system, the component of the event system, the component of the retail point-of-sale system and/or the gaming establishment device; detecting the presence and/or identity of various persons (e.g., users, casino employees, etc.), devices (e.g., user input devices), and/or systems within a predetermined proximity to the component of the gaming establishment fund management system, the component of the gaming establishment patron management system, the component of the debit card issuer system, the component of the event system, the component of the retail point-of-sale system and/or the gaming establishment device.

The at least one data preservation component is configured to detect or sense one or more events and/or conditions that, for example, may result in damage to the component of the gaming establishment fund management system, the component of the gaming establishment patron management system, the component of the debit card issuer system, the component of the event system, the component of the retail point-of-sale system and/or the gaming establishment device and/or that may result in loss of information associated with the component of the gaming establishment fund management system, the component of the gaming establishment patron management system, the component of the debit card issuer system, the component of the event system, the component of the retail point-of-sale system and/or the gaming establishment device. Additionally, the data preservation system may be operable to initiate one or more appropriate action(s) in response to the detection of such events/conditions.

The at least one motion/gesture analysis and interpretation component is configured to analyze and/or interpret information relating to detected user movements and/or gestures to determine appropriate user input information relating to the detected user movements and/or gestures. For example, in one embodiment, the at least one motion/gesture analysis and interpretation component is configured to perform one or more of the following functions: analyze the detected gross motion or gestures of a user; interpret the user's motion or gestures (e.g., in the context of a casino game being played) to identify instructions or input from the user; utilize the interpreted instructions/input to advance the game state; etc. In other embodiments, at least a portion of these additional functions may be implemented at a remote system or device.

The at least one portable power source enables the component of the gaming establishment fund management system, the component of the gaming establishment patron management system, the component of the debit card issuer system, the component of the event system, the component of the retail point-of-sale system and/or the gaming establishment device to operate in a mobile environment.

The at least one geolocation module is configured to acquire geolocation information from one or more remote sources and use the acquired geolocation information to determine information relating to a relative and/or absolute position of the component of the gaming establishment fund management system, the component of the gaming establishment patron management system, the component of the debit card issuer system, the component of the event system, the component of the retail point-of-sale system and/or the gaming establishment device. For example, in one implementation, the at least one geolocation module is configured to receive GPS signal information for use in determining the position or location of the component of the gaming establishment fund management system, the component of the gaming establishment patron management system, the component of the debit card issuer system, the component of the event system, the component of the retail point-of-sale system and/or the gaming establishment device. In another implementation, the at least one geolocation module is configured to receive multiple wireless signals from multiple remote devices (e.g., component of the gaming establishment fund management system, the gaming establishment patron management system, the retail point-of-sale system and/or the gaming establishment devices, servers, wireless access points, etc.) and use the signal information to compute position/location information relating to the position or location of the component of the gaming establishment fund management system, the component of the gaming establishment patron management system, the component of the debit card issuer system, the component of the event system, the component of the retail point-of-sale system and/or the gaming establishment device.

The at least one user identification module is configured to determine the identity of the current user or current owner of the component of the gaming establishment fund management system, the component of the gaming establishment patron management system, the component of the debit card issuer system, the component of the event system, the component of the retail point-of-sale system and/or the gaming establishment device. For example, in one embodiment, the current user is required to perform a login process at the component of the gaming establishment fund management system, the component of the gaming establishment patron management system, the component of the debit card issuer system, the component of the event system, the component of the retail point-of-sale system and/or the gaming establishment device in order to access one or more features. Alternatively, the component of the gaming establishment fund management system, the component of the gaming establishment patron management system, the component of the debit card issuer system, the component of the event system, the component of the retail point-of-sale system and/or the gaming establishment device is configured to automatically determine the identity of the current user based on one or more external signals, such as an RFID tag or badge worn by the current user and that provides a wireless signal to the component of the gaming establishment fund management system, the component of the gaming establishment patron management system, the component of the debit card issuer system, the component of the event system, the component of the retail point-of-sale system and/or the gaming establishment device that is used to determine the identity of the current user. In at least one embodiment, various security features are incorporated into the component of the gaming establishment fund management system, the component of the gaming establishment patron management system, the component of the debit card issuer system, the component of the event system, the component of the retail point-of-sale system and/or the gaming establishment device to prevent unauthorized users from accessing confidential or sensitive information.

The at least one information filtering module is configured to perform filtering (e.g., based on specified criteria) of selected information to be displayed at one or more displays of the component of the gaming establishment fund management system, the component of the gaming establishment patron management system, the component of the debit card issuer system, the component of the event system, the component of the retail point-of-sale system and/or the gaming establishment device.

In various embodiments, the component of the gaming establishment fund management system, the component of the gaming establishment patron management system, the component of the debit card issuer system, the component of the event system, the component of the retail point-of-sale system and/or the gaming establishment device includes a plurality of communication ports configured to enable the at least one processor of the component of the gaming establishment fund management system, the component of the gaming establishment patron management system, the component of the debit card issuer system, the component of the event system, the component of the retail point-of-sale system and/or the gaming establishment device to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, the component of the gaming establishment fund management system, the component of the gaming establishment patron management system, the component of the debit card issuer system, the component of the event system, the component of the retail point-of-sale system and/or the gaming establishment device has a support structure, housing, or cabinet that provides support for a plurality of the input devices and the output devices of the component of the gaming establishment fund management system, the component of the gaming establishment patron management system, the component of the debit card issuer system, the component of the event system, the component of the retail point-of-sale system and/or the gaming establishment device.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention is claimed as follows:

1. A system comprising:

a processor; and a memory device that stores a plurality of instructions that, when executed by the processor responsive to a restriction placement event occurring in association with a debit card operable to access funds maintained in a first gaming establishment account, and a restriction being placed on the debit card, cause the processor to:

place a restriction on the first gaming establishment account, wherein the restriction remains in place for at least one subsequent transaction requested against the first gaming establishment account, and communicate data associated with the placed restriction, wherein responsive to a first component that maintains a second gaming establishment account receiving the data, the first component determines whether to place the restriction on the second gaming establishment account.

2. The system of claim 1, wherein the first gaming establishment account comprises a cashless wagering account.

3. The system of claim 2, wherein a component of a debit card issuer associated with the debit card places the restriction on the debit card.

4. The system of claim 3, wherein prior to the placement of the restriction on the debit card, the debit card was operable to access funds maintained in the cashless wagering account in association with a purchase transaction initiated in association with the debit card at a point-of-sale terminal.

5. The system of claim 1, wherein the second gaming establishment account comprises a player tracking account.

6. The system of claim 1, wherein the data associated with the placed restriction is communicated to a second component of an event system which communicates the data associated with the placed restriction to the first component.

7. The system of claim 1, wherein a first restriction placement event is associated with the placement of the restriction on the first gaming establishment account and a second, different restriction placement event is associated with no placement of the restriction on the first gaming establishment account.

8. The system of claim 1, wherein the restriction comprises at least one of a block, a lock and a closure.

9. The system of claim 1, wherein the restriction placement event comprises a predetermined quantity of incorrect personal identification numbers being inputted in association with the debit card.

10. A system comprising:

a processor; and a memory device that stores a plurality of instructions that, when executed by the processor, cause the processor to:

responsive to a restriction being placed on a debit card operable to access funds maintained in a cashless wagering account:

place a restriction on the cashless wagering account, wherein the restriction remains in place for at least one debit card initiated purchase transaction against the cashless wagering account, and communicate data associated with the placed restriction to a component of an event system that publishes the data associated with the placed restriction for another component that maintains another gaming establishment account to receive and apply the restriction to that other gaming establishment account, and responsive to no restriction being placed on the debit card associated with the cashless wagering account, enable the debit card to initiate a purchase transaction at a point-of-sale terminal.

11. The system of claim 10, wherein the placed restriction comprises at least one of a block, a lock and a closure.

12. A method of operating a system, the method comprising:

responsive to a restriction placement event occurring in association with a debit card operable to access funds maintained in a first gaming establishment account, and a restriction being placed on the debit card:

placing, by a processor, a restriction on the first gaming establishment account, wherein the restriction remains in place for at least one subsequent transaction requested against the first gaming establishment account, and communicating data associated with the placed restriction, wherein responsive to a first component that maintains a second gaming establishment account receiving the data, the first component determines whether to place the restriction on the second gaming establishment account.

13. The method of claim 12, wherein the first gaming establishment account comprises a cashless wagering account.

14. The method of claim 13, wherein a component of a debit card issuer associated with the debit card places the restriction on the debit card.

15. The method of claim 14, wherein prior to the placement of the restriction on the debit card, the debit card was operable to access funds maintained in the cashless wagering account in association with a purchase transaction initiated in association with the debit card at a point-of-sale terminal.

16. The method of claim 12, wherein the second gaming establishment account comprises a player tracking account.

17. The method of claim 12, wherein the data associated with the placed restriction is communicated to a second component of an event system which communicates the data associated with the placed restriction to the first component.

18. The method of claim 12, wherein a first restriction placement event is associated with the placement of the restriction on the first gaming establishment account and a second, different restriction placement event is associated with no placement of the restriction on the first gaming establishment account.

19. The method of claim 12, wherein the restriction comprises at least one of a block, a lock and a closure.

20. The method of claim 12, wherein the restriction placement event comprises a predetermined quantity of incorrect personal identification numbers being inputted in association with the debit card.

* * * * *